(12) United States Patent
Hori et al.

(10) Patent No.: US 7,221,667 B2
(45) Date of Patent: May 22, 2007

(54) WIRELESS LAN COMMUNICATION SYSTEM

(75) Inventors: Masato Hori, Kawasaki (JP); Yoshikazu Kobayashi, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 784 days.

(21) Appl. No.: 10/674,499

(22) Filed: Oct. 1, 2003

(65) Prior Publication Data

US 2004/0063458 A1    Apr. 1, 2004

(30) Foreign Application Priority Data

Oct. 1, 2002    (JP)    ............... 2002-288536

(51) Int. Cl.
*H04Q 7/24*    (2006.01)
(52) U.S. Cl. ................... 370/338; 455/41.2; 455/552.1
(58) Field of Classification Search ................ 370/338, 370/328, 329; 455/552.1, 41.2, 507, 509
See application file for complete search history.

(56) References Cited

U.S. PATENT DOCUMENTS

| 6,925,378 B2* | 8/2005 | Tzamaloukas | ............... 701/200 |
| 2003/0236064 A1* | 12/2003 | Shiohara et al. | ............... 455/1 |
| 2004/0125778 A1* | 7/2004 | Lin et al. | ............... 370/338 |

FOREIGN PATENT DOCUMENTS

| JP | 11-252114 | 9/1999 |
| JP | 2002-330142 | 11/2002 |
| JP | 2002-344458 | 11/2002 |
| JP | 2003-249939 | 9/2003 |
| JP | 2004-72565 | 3/2004 |
| JP | 2004-254254 | 9/2004 |

OTHER PUBLICATIONS

Japanese Office Action dated Dec. 14, 2006 with English translations of pertinent portions.

* cited by examiner

*Primary Examiner*—Nguyen T. Vo
(74) *Attorney, Agent, or Firm*—Whitham Curtis Christofferson & Cook, PC

(57) ABSTRACT

In a wireless LAN communication system, a communication mode is automatically switched between an infrastructure mode and an ad-hoc mode. Communication between two stations is started in the infrastructure mode. Packets transmitted in an infrastructure network are monitors to detect a packet transmitted to an access point and addressed, as a final destination, to one's own station or a destination station. If such a packet is detected, it is determined that a transmitting or source station is in a state that allows an ad-hoc communication. A channel searcher of the access point searches for available channels of an ad-hoc network. A switching controller selects one of the available channels and transmits information indicating the selected channel to the source and destination stations. In response to receiving the information indicating the selected channel, the source and destination stations starts direct communication using the selected channel of the ad-hoc network. The selection of the channel may be performed by a station. Associated data may be stored in a temporary data storage unit.

12 Claims, 19 Drawing Sheets

WIRELESS LAN COMMUNICATION SYSTEM

BACKGROUND OF THE INVENTION

1. Field of the Invention

The present invention relates to a wireless LAN communication system having an infrastructure mode and an ad-hoc mode. Wherein, in the infrastructure mode, each station communicates with another station via an access point, while, in the ad-hoc mode, direct communication is performed between two stations located near each other. More particularly, the present invention relates to a wireless LAN communication system as follows. In wireless LAN communication system, when one station is capable of communicating directly with another station without needing an access point, communication is performed in the ad-hoc mode. And when communication in the ad-hoc mode is impossible, communication is performed in the infrastructure mode. In such cases, the communication mode should be automatically switched between the ad-hoc mode and the infrastructure mode depending on the status.

2. Description of the Related Art

Wireless LANs generally have an infrastructure network and an ad-hoc network. The infrastructure network is used for communications between stations via access points, and the ad-hoc network is used for direct communications between stations located near each other.

In conventional wireless LAN communication systems of the type described above, a wireless terminal serving as a station has information indicating other wireless terminals with which ad-hoc communication is possible. When a wireless terminal communicates with another wireless terminal that is registered in the cash memory, the ad-hoc mode is automatically selected at the start of the communication, and thus communication is performed without passing through an access point (Japanese Unexamined Patent Publication JP-A No. 7-303105).

At the start of communication, a wireless station examines a database to determine whether a station with which to communicate is registered in the database and whether communication in the ad-hoc mode is possible. In the case in which the station with which to communication is not registered in the database, it is tested whether communication in the ad-hoc mode is possible. If it turns out that communication in the ad-hoc mode is possible, the station is registered in the database, and a communication channel is established. If communication in the ad-hoc mode is impossible, the communication mode is switched into the infrastructure mode, and communication procedure is started.

When a station with which to communicate is already registered in the database, communication procedure is started in the ad-hoc mode and communication is established. However, if the situation has changed into a state in which communication in the ad-hoc mode is no longer possible, the communication mode is switched into the infrastructure mode, and communication procedure is started. In a case in which communication in the ad-hoc mode becomes impossible in the middle of communication because of movement of a station, the station automatically switches the communication mode into the infrastructure mode to try to maintain communication.

In the conventional wireless LAN communication system, although a wireless station can automatically switch the communication mode from the ad-hoc mode into the infrastructure mode, automatic switching from the infrastructure mode into the ad-hoc mode is impossible. That is, the capability of automatic switching of the communication mode is very limited.

This is because communication procedure is started in the ad-hoc mode regardless of information recorded in the database.

SUMMARY OF THE INVENTION

In view of the above, an object of the present invention is to provide a wireless LAN communication system in which the communication mode is automatically switched between the infrastructure mode and the ad-hoc mode such that a proper communication mode is selected depending on the communication status.

To achieve the above object, the present invention provides a wireless LAN communication system in which, when communication in a station is started in the infrastructure mode, a final destination station searches, by means of monitoring data transmitted from a transmitting or source station to an access point. And the final destination station determiner, if such data is detected, that communication with the source station in the ad-hoc mode is possible, and the communication mode is automatically switched into the ad-hoc mode. An ad-hoc network channel used in the ad-hoc mode is selected by the final destination station, or the access point notified that communication is possible in the ad-hoc mode thereby. The data may bs a signal or a message, and the format of the data is not limited to a packet, for example.

Thus, in this wireless LAN communication system according to the present invention, the communication mode is automatically switched from the infrastructure mode to the ad-hoc mode or from the ad-hoc mode to the infrastructure mode, into an appropriate mode depending on the situation.

In a specific aspect of the wireless LAN communication system having an infrastructure mode in which stations communicate with each other via an access point and also having an ad-hoc mode in which communication is performed directly between stations located near each other, ad-hoc channels are determined by stations. In this aspect, only each station has switching controller for switching the communication mode.

The switching controller controls communication mode switching as follows. In a case in which a station is receiving data from a transmitting or source station in the infrastructure made, the switching controller of the station monitors data transmitted in the infrastructure network to detect data transmitted from the source station to an access point and addressed to one's own station as the final destination station. If such data is detected, the switching controller of the final destination station determines that communication with the source station in the ad-hoc mode is possible. And the switching controller temporarily stores the detected data, and selects and reserves one of available channels for use in communication in the ad-hoc mode. Thereafter, the switching controller of the final destination station proposes to the source station via the access point that the communication mode should be switched into the ad-hoc mode using the selected channel. If the proposal is accepted, the switching controller switches the communication channel to the selected channel.

There is a case that the station is acting as a source station and is transmitting data to a final destination station in the infrastructure mode. In this case, if the switching controller of the source station receives a proposal from the destination station that the communication mode should be switched into the ad-hoc mode using a selected channel, the switching controller temporarily stores data to be transmitted and returns a response to indicate the acceptance of the proposal. Thereafter, the switching controller switches the communication channel to the selected channel.

In another aspect of the wireless LAN communication system according to the present invention, ad-hoc channels are determined by access points. In this aspect, an access point transferring data in the infrastructure mode includes first data transmitter/receiver and first controller, while each station includes second data transmitter/receiver and second controller.

The first data transmitter/receiver of the access point temporarily stores received data, returns an acknowledge for the received data to a source station, and transmits the data to a destination station. If the data is received by the destination station, an acknowledge is returned from the destination station. If the first controller receives the acknowledge for the above-described data before the first controller transmits the data to the destination station, the first controller select an ad-hoc communication channel and transmits the temporarily stored date to the destination station. Upon receiving an acknowledge, the first controller proposes to the source station and the destination station that the channel should be switched into the ad-hoc communication channel. If the proposal is accepted the first controller doses the communication channel in the infrastructure mode used in transferring data.

If the second controller of the station received data from the access point in the infrastructure mode, the second controller returns an acknowledge for the received data to the access point. The second controller searches, by means of monitoring, for data transmitted from the source station to the access point and addressed, as a final destination, to the station to which second controller belongs. If such data is detected, the second controller transmits an acknowledge for that date to the access point. If the second controller receives a proposal from the access point that the communication mode should be switched into the ad-hoc mode, the second controller returns an acceptance response to indicate the acceptance of the proposal, and switches the communication mode into the ad-hoc mode.

In this wireless LAN communication system, each access point stores ad-hoc network information associated with an infrastructure network area of the access point. And the access point periodically transmits beacon signals to stations located in the communication area thereby periodically switching the communication mode between the infrastructure mode and the ad-hoc mode. This makes it possible to deal with roaming of a mobile station. It becomes also possible to allow data transmitted from a station to arrive at a station being performing communication in the ad-hoc mode. This makes it possible for a third station to participate in communication.

DESCRIPTION OF THE PREFERRED EMBODIMENTS

The present invention is described in further detail below with reference to preferred embodiments in conjunction with the accompanying drawings. Note that the drawings show only major parts relating to the present invention.

Figure 1:
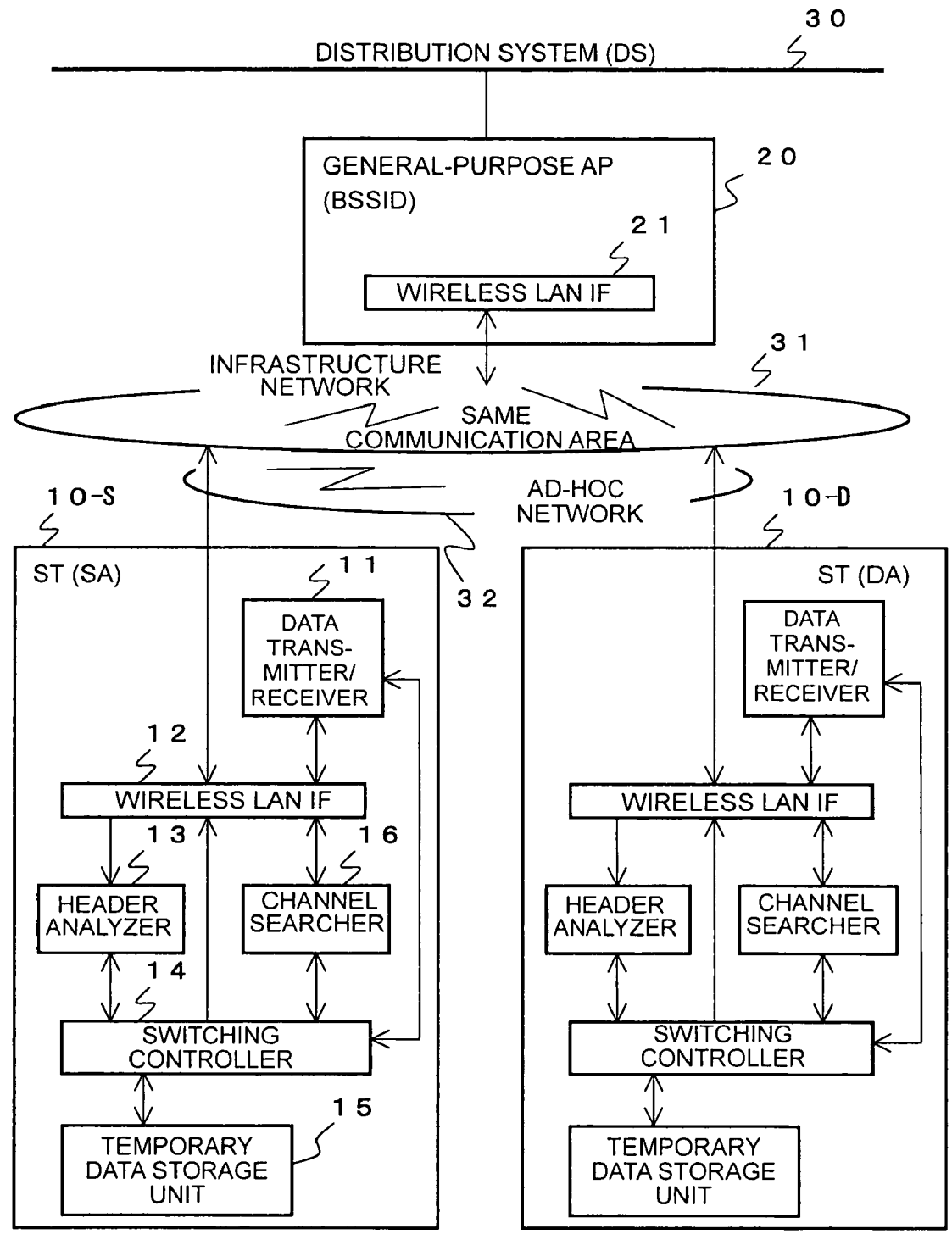
FIG. 1 is a diagram showing functional blocks and connections among functional blocks in a wireless LAN communication system according to an embodiment of the present invention.

FIG. 1 is a block diagram showing a wireless LAN communication system according to an embodiment of the present invention.

In FIG. 1, shown are two stations (STs) 10 and one general-purpose access point (AP) 20 in the wireless LAN communication system. A distribution system (DS)) 30 is a wired LAN such as Ethernet (registered trademark). Although only one general-purpose AP 20 is shown in. FIG. 1, the wireless LAN communication system generally includes a plurality of general-purpose APs 20 forming an extended service set (ESS).

An infrastructure network 31 and an ad-hoc network 32 form a wireless LAN. The general-purpose AP 20 can communicate with STs 10 in a communication area provided by the infrastructure network 31. The ad-hoc network 32 provides a communication area in which STs 10 can directly communicate with each other.

The STs 10 are wireless terminals such as personal computers or portable telephones. In this specific example, the STs 10 are mobile communication terminals. Addresses are assigned to respective STs 10 such that an ST 10 that transmits data is assigned a source address (SA), and an ST 10 that finally receives data is assigned a destination address (DA), as a MAC (Media Access Control) address Hereinafter, a transmitting ST 10 will be denoted as a source ST(SA) 10-S, and a finally-receiving ST 10 will be denoted as a destination ST(DA) 10-D.

Each ST 10 includes a data transmitter/receiver 11, a wireless LAN interface 12, a header analyzer 13, a switching controller 14, a temporary data storage unit 15, and a channel searcher 16. Unlike the convention station, the ST 10 has the capability of monitoring packets transmitted via an access point in the infrastructure mode to determine whether the current communication mode can be switched to the ad-hoc mode. If it is determined that the switching is possible, one of available channels for use in communication in the ad-hoc mode is selected, and the communication mode is switched into the ad-hoc mode.

The general-purpose AP 20 is similar to a conventional general-purpose AP and is assigned a BSSID (base service set identifier) as a MAC address. In FIG. 1, a wireless LAN interface 21 is an interface for connecting an internal component with the infrastructure network 31 of the wireless LAN to communicate with an ST 10 via the infrastructure network 31. In wireless LANs, data is transmitted using packets. Packets are different in format depending on whether packets are transmitted through the infrastructure network 31 or the ad-hoc network 32. Each packet includes header information including information indicating whether the packet is for communication through the infrastructure network 31 or the ad-hoc network 32.

Under the control of the switching controller 14 and general control means (not shown), the data transmitter/receiver 11 transmits or receiver packets to or from the infrastructure network 31 or the ad-hoc network 32 via the wireless LAN interface 12. Wherein, the content of the header of each packet is varied depending on whether the packet is transmitted through the infrastructure network 31 or the ad-hoc network 32. The wireless LAN interface 12 is responsible for transmitting/receiving signals and packets between internal components and the wireless LAN.

The header analyzer 13 monitors, via the wireless LAN interface 13, signals and packets transmitted in the wireless LAN. If the header analyzer 13 detects a packet arrived finally at one's own ST 10 via the infrastructure network 31 but not via the general-purpose AP 20, the header analyzer 13 informs the switching controller 14 of the above fact. In the header of each packet, addresses of a source station, a final destination station, and an access point are described. For example, there is a packet addressed as a final destination to the ST(DA) 10-D to be transmitted from the ST(6A) 10-S to the general-purpose AP(BSSID) 20. In this case, addresses are described in the header of the packet in the form of "receiving address/transmitting address/final destination address (DA) or source address (SA)". On the other hand, in the case of a packet directly transmitted from the ST(SA) 10-S to the ST(DA) 10-D in the ad-hoc network 32, a bit indicating the hierarchy of the network is cleared, and addresses are described in the header in the form of "final destination address/source address", that is, in the form of "DA/SA".

More specifically, when a packet is transmitted from an ST(SA) 10-S to an ST(DA) 10-D via the general-purpose AP(BSSID) 20 in the infrastructure network 31, "BSSID/SA/DA" is inserted as address information in the header when the packet is transmitted from the ST(SA) 10-S to the general-purpose AP(BSSID) 20, and "DA/BSSID/SA" is inserted as address information in the header when the packet is transmitted from the general-purpose AP(BSSID) 20 to the ST(DA) 10-D.

If the switching controller 14 receives, from the header analyzer 13, a notice indicating that a packet address to the station to which the switching controller 14 belongs has been detected from monitored packets. Upon receiving the notice, the switching controller 14 stores the packet data into the temporary data storage unit 15 and requests the channel searcher 16 to search ad-hoc communication channels. If the switching controller 14 confirms that there is no other station with which to communicate the switching controller 14 selects one of available channels detected by the channel searcher 16.

Under the control of the switching controller 14, the temporary data storage unit 15 temporarily stores data. In response to a request from the switching controller 14, the channel searcher 16 detects available channels and selects one of them as a channel for use in communication via the ad-hoc network 32 to which the network is to be switched from the infrastructure network 31.

Although in the following description, the ST(SA) 10-S and the ST(DA) 10-D operate differently, there is no difference in structure between them, and both stations have the same functions.

Figure 2:
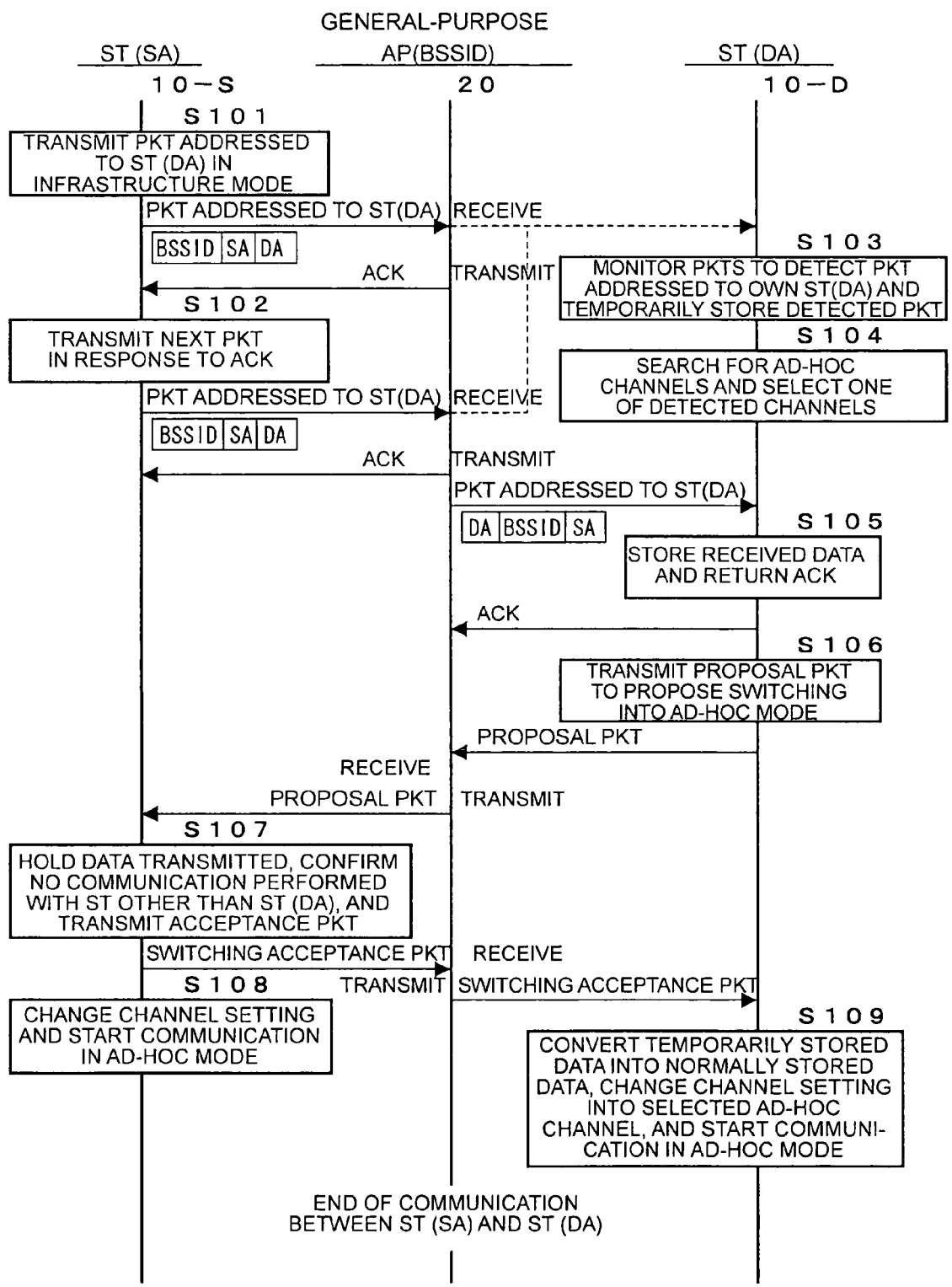
FIG. 2 is a sequence chart showing a mode switching procedure in the wireless LAN communication system shown in FIG. 1, according to an embodiment of the present invention.

Referring to FIG. 1 and FIG. 2, the major portions of a process of switching the communication mode from the infrastructure mode in which the ST(SA) 10-S communicate with the ST(DA) 10-D via the infrastructure network 31, into the ad-hoc mode in which the ST(SA) 10-S and the ST(DA) 10-D communicate directly with each other using the ad-hoc network 32 are described below.

First, in the ST(SA) 10-S, the date transmitter/receiver 11 transmits a packet (hereinafter, referred to as a PKT) in the infrastructure mode from the wireless LAN interface 13 to the ST(DA) 10-D via the infrastructure network 31 (step S101). The PKT includes a header in Which "BSSID/SA/DA" is described as address information. If this PKT is successfully received by the general-purpose access point 20 with an address of "BSSID", an acknowledge PKT (hereinafter, referred to simply as an ACK) is returned to the data transmitter/receiver 11 from the general-purpose AP 20. Upon receiving the ACK, the data transmitter/receiver 11 transmits a next PKT (in step S102).

If the general-purpose AP 20 with the address "BSSID" receives a PKT whose header includes address information "BSSID/SA/DA", the general-purpose AP 20 returns an ACK to a destination station and transfers the PKT to a destination station (ST(DA) 10-D) according to the address information described in the header. When the PKT is transferred to the ST(DA) 10-D, the address information "DA/BSSID/SA" is inserted in the header.

Meanwhile, in the ST(DA) 10-D, which is the destination of the PKT, the header analyzer 13 monitors the channels of the wireless LAN via the wireless LAN interface 12 to detect a PKT, addressed to the ST(DA) 10-D and having address information "BSSID/SA/DA" in its header, transmitted from the infrastructure network 31. If the header analyzer 13 detects such a PKT, the header analyzer 13 notifies the switching controller 14 of reception of the PKT and transfers the received PKT data to the switching controller 14. This causes the switching controller 14 to recognize that the source station (ST(SA) 10-S) is located in the ad-hoc network 32. The switching controller 14 stores the received data into the temporary data storage unit 15 (step S103) and requests the channel searcher 16 to search ad-hoc channels and select one available channel. In response to the request, the channel searcher 16 searches ad-hoc channels and selects an available channel (step S104).

Thereafter, in the ST(DA) 10-D, if the header analyzer 13 detects, from intercepted PKTs, a PKT having address information "DA/BSSID/SA" described in its head and transmitted from the general-purpose AP 20, the header analyzer 13 stores the received date in a normal fashion, returns an ACK to the general-purpose AP 20 (step S105), and notifies the switching controller 14 of the reception of the PKT. Upon receiving the notice, the switching controller 14 transmits, to the general-purpose AP 20 via the wireless LAN interface 12, a proposal PKT proposing that the communication mode should be switched into the ad-hoc mode together with information indicating the selected channel.

The general-purpose AP 20 transfers the received proposal PKT to the ST(SA) 10-S. In the ST(SA) 10-S, it the switching controller 14 receives the proposal PKT via the wireless LAN interface 12, the switching controller 14 retains data to be transmitted without transmitting it. The switching controller 14 confirms that there is no communication other than that with the ST(DA) 10-D, and the switching controller 14 returns an acceptance PKT indicating the acceptance of switching to the general-purpose AP 20 (step S107). Furthermore, the switching controller 14 changes the setting according to the received channel information and starts ad-hoc communication with the ST(DA) 10-D (step S108).

In the ST(DA) 10-D, if the switching controller receives the acceptance PKT indicating the acceptance of switching the communication mode, the switching controller 14 converts the temporarily stored data into data stored in the normal fashion, switches the current channel to the selected channel specified by the general-purpose AP 20, and starts ad-hoc communication with the ST(SA) 10-S (step S109).

After the AP 20 transform the proposal PKT and the acceptance PKT, the AP 20 ends the process for communication between the ST(SA) 10-S and the ST(DA) 10-D.

Figure 3:
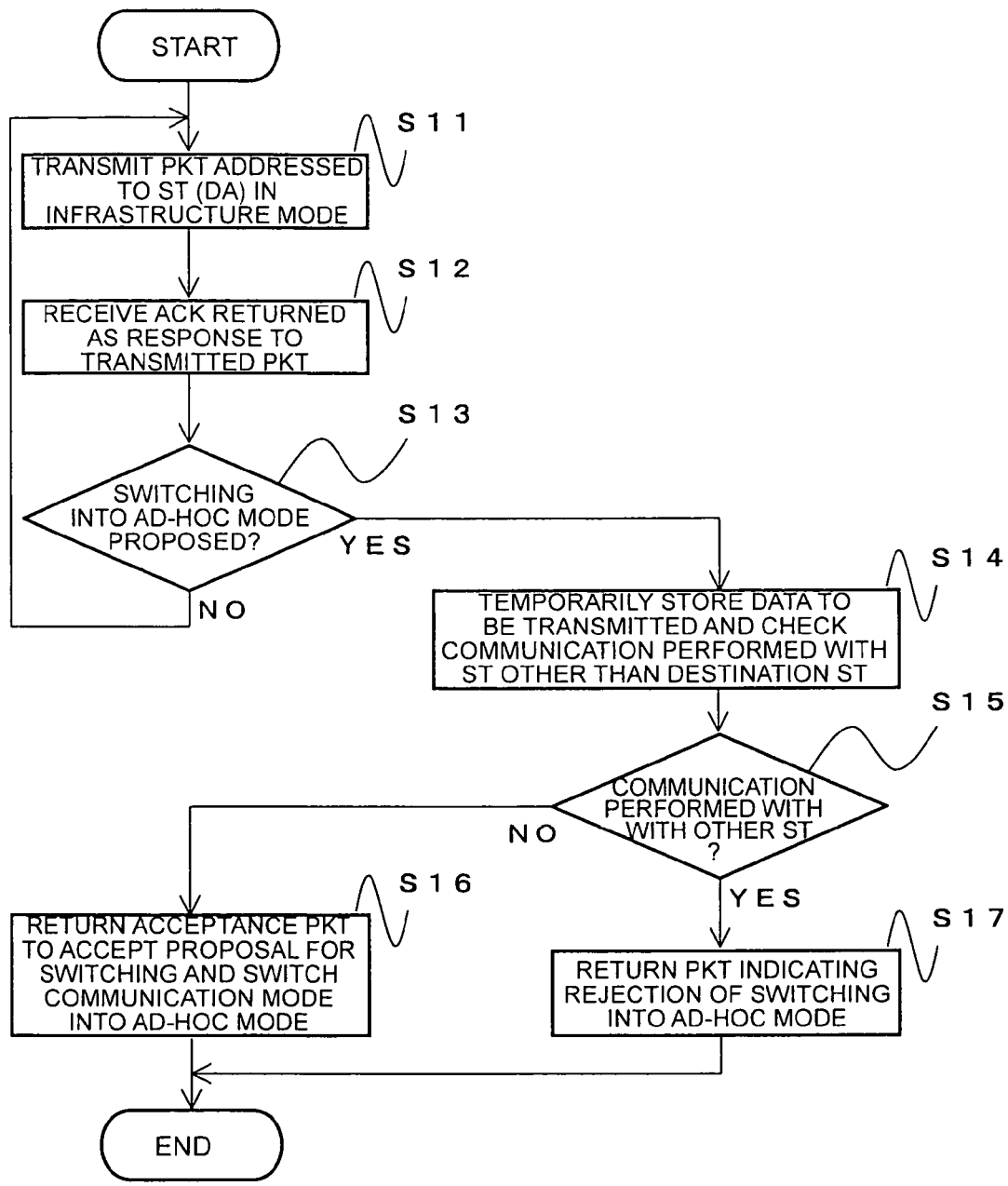
FIG. 3 is a flow chart showing a mode switching procedure performed by an ST(SA) shown in FIG. 1, according to an embodiment of the present invention.

Referring to FIG. 3 and also FIGS. 1 and 2 as required, the details of the operation of the ST(SA) 10-S are described below.

In the ST(SA) 10-S, the data transmitter/receiver 11 inserts address information "BSSID/SA/DA" into the header of a PKT addressed to the ST(DA) 10-D and transmits it to the AP 20 via the wireless LAN interface 12 in the infrastructure mode (step S11). If the PKT is received by the AP 20, an ACK for the PKT is received (step S12). Although not shown in the flow chart of FIG. 3, if the ACK is not received in a predetermined period of time, the PKT is retransmitted. When steps S11 and 812 are performed repeatedly, the data transmitter/receiver 11 receives a proposal PKT proposing that the communication channel should be switched to an ad-hoc channel, that is, the answer to step S13 is "yes". The data transmitter/receiver 11 holds data to be transmitted without transmitting it, and checks whether there is communication to be performed with a station other than the destination station ST(DA) 10-D (step S14). If it is determined that there is no communication to be performed with a station other than the destination station ST(DA) 10-D, that is, if the answer to step S15 is "no", the data transmitter/receiver 11 returns an acceptance PKT indicating the acceptance of switching of the channel. The data transmitter/receiver 11 notifies the switching controller 14 of the above fact in response, the switching controller 14 switches the communication mode into the ad-hoc mode (step S16).

Figure 4:
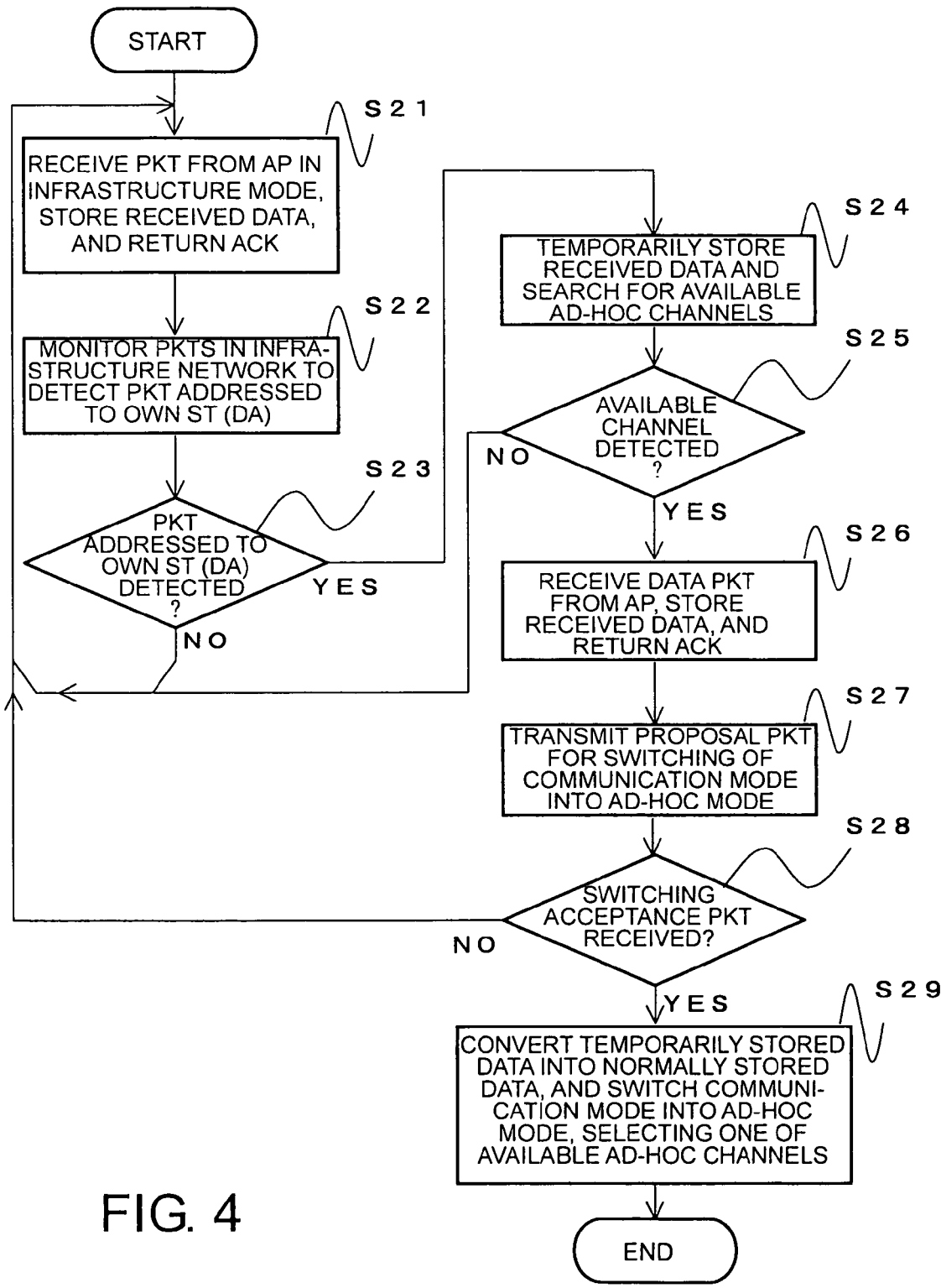
FIG. 4 is a flow chart showing a mode switching procedure performed by an ST(DA) shown in FIG. 1, according to an embodiment of the present invention.

Referring to FIG. 4 and also FIGS. 1 and 2, the details of the operation of the ST(DA) 10-D are described below.

In the ST(DA) 10-D, if the data transmitter/receiver 11 receives a PKT whose header includes address information "DA/BSSID/SA", from the ST(SA) 10-S via the general-purpose AP 20 and via the wireless LAN interface 12 in the infrastructure mode, the data transmitter/receiver 11 stores the received data and returns an ACK for the PKT (step S21). This process is performed repeatedly each time a PKT is received.

Meanwhile, the header analyzer 13 monitors, via the wireless LAN interface 12, PKTs transmitted in the infrastructure network 31 of the wireless LAN to detect a PKT with address information "BSSID/SA/DA" described in its header transmitted to the general-purpose AP(BSSID) 20 and addressed as a final destination to the ST(DA) 10-D.

When the header analyzer 13 detects a PKT having address information in which the ST(DA) 10-D is specified as the destination (that is, if the answer to step S23 is yes), the header analyzer 13 notifies the switching controller 14 of the detection of the PKT. The switching controller 14 stores the received PKT data into the temporary storage unit 15 and requests the channel searcher 16 to detect an available channel for communication in the ad-hoc mode (step S24). On the other hand, if the answer to step S23 is "no", that is, if a PKT is not detected, the process returns to step S21 to repeat step S21 and the following steps.

An available channel is detected in step S24, that is, the answer to step S25 is "yes", when the data transmitter/receiver 11 receives a next PKT in the infrastructure mode. In this case, the data transmitter/receiver 14 stores the received PKT data and returns an ACK for the received PKT (step as S26). In the case in which this data has already been stored in the temporarily storage mode as a result of the monitoring, the temporarily stored data is deleted. Thereafter, the switching controller 14 produces a proposal PKT proposing that the communication mode should be switched into the ad-hoc mode and transmits it to the infrastructure network 31 (step S27).

There is a case that the switching controller 14 receives an acceptance PKT as a response to the proposal PKT, that is, the answer to step S28 is "yes". In this case, the switching controller 14 transfers the temporarily stored data into a normal storage area and switches the communication mode into the ad-hoc mode (step S29). Thereafter, communication in the ad-hoc mode is started using the selected channel.

If the answer to step S25 is "no", or if the answer to step S28 is "no", the flow returns to step S21, and the above-described process is repeated.

Figure 5:
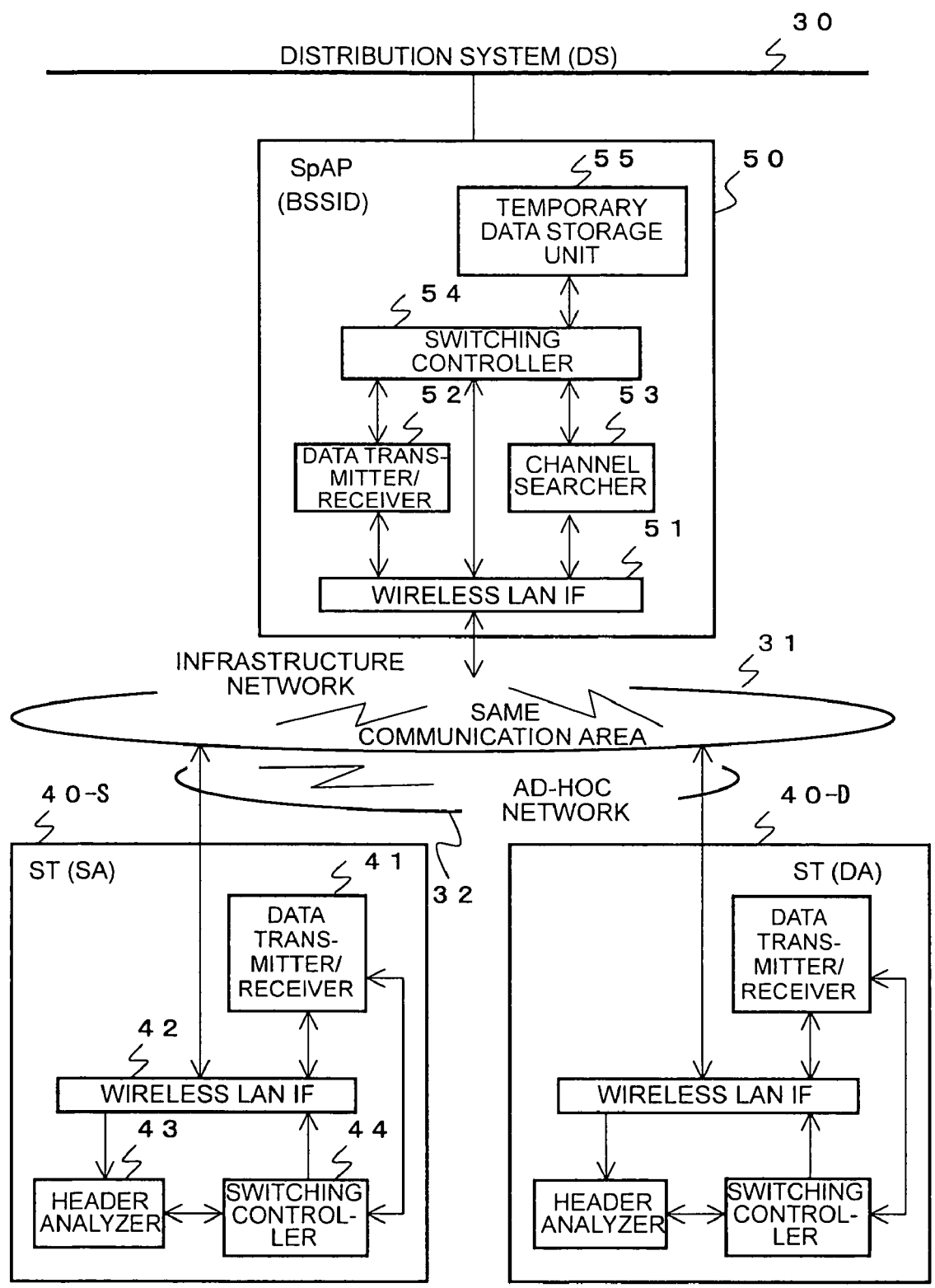
FIG. 5 is a diagram showing functional blocks and connections among functional blocks in a wireless LAN communication system according to another embodiment of the present invention.

Referring to FIG. 5, another embodiment is described below. The difference of this embodiment from the previous embodiment is that when a station decides to switch the communication mode into the ad-hoc mode, an access point determines a channel to be used in the ad-hoc network.

FIG. 5 shows an ST(SA) 40-S, an ST(DA) 40-D, and a SpAP(BSSID) 50, wherein SpAP refers to a special AP, and characters enclosed in parentheses denote addresses.

The ST 40 includes a data transmitter/receiver 41, a wireless LAN interface 42, a header analyzer 43, and a switching controller 44. The SpAP 50 includes a wireless LAN interface 51, a data transmitter/receiver 52, a channel searcher 53, a switching controller 54, and a temporary storage unit 55. That is, not only stations are different from conventional stations, but also access points are different from the conventional access points. More specifically, the channel searcher and the temporary data storage unit are removed from each of stations the number of which is great, and the channel searcher and the temporary data storage unit are additionally disposed in each of access points the number of which is small.

The data transmitter/receiver 41, the wireless LAN interface 42, and the header analyzer 43 are similar to those described above with reference to FIG. 1. The switching controller 44 is different from that described above with reference to FIG. 1. In that the switching controller 44 does not have the capabilities of channel selection, transmission of a proposal PKT proposing that the communication mode should be switched into the ad-hoc mode, and reception of an acceptance PKT.

The data transmitter/receiver 52 of the SpAP 50 has the capability of storing received data in the temporary storage unit 55 via the switching controller 54 in addition to the capability of transmitting data PKTs and receiving ACKs to/from the wireless LAN via the wireless LAN interface 51 under the control of the switching controller 64 and general control means (not shown). The channel searcher 53 searches for channels used in the ad-hoc mode via the wireless LAN interface 51.

If an ACK received from the ST(DA) 40-D indicates that the communication mode should be switched into the ad-hoc mode, the switching controller 54 selects one of channels detected by the channel searcher 53 for use in the ad-hoc mode. Furthermore, the switching controller 54 confirms that there is no communication other than that between the ST(SA) 40-S and the ST(DA) 40-D, and the switching controller 54 transmits the temporarily stored data to the ST(DA) 40-D and receives an ACK for that data. Furthermore, the switching controller 54 transmits proposal PKTs to the ST(SA) 40-S and the ST(DA) 40-D to propose that the communication mode should be switched into the ad-hoc mode. If the proposal is accepted, the communication mode is switched into the ad-hoc mode.

Under the control of the switching controller 14, the temporary data storage unit 55 temporarily stores received PKT data. When an ACK for the PKT transmitted to the ST(DA) 40-D is received, the temporarily stored PKT data is deleted.

Figure 6:
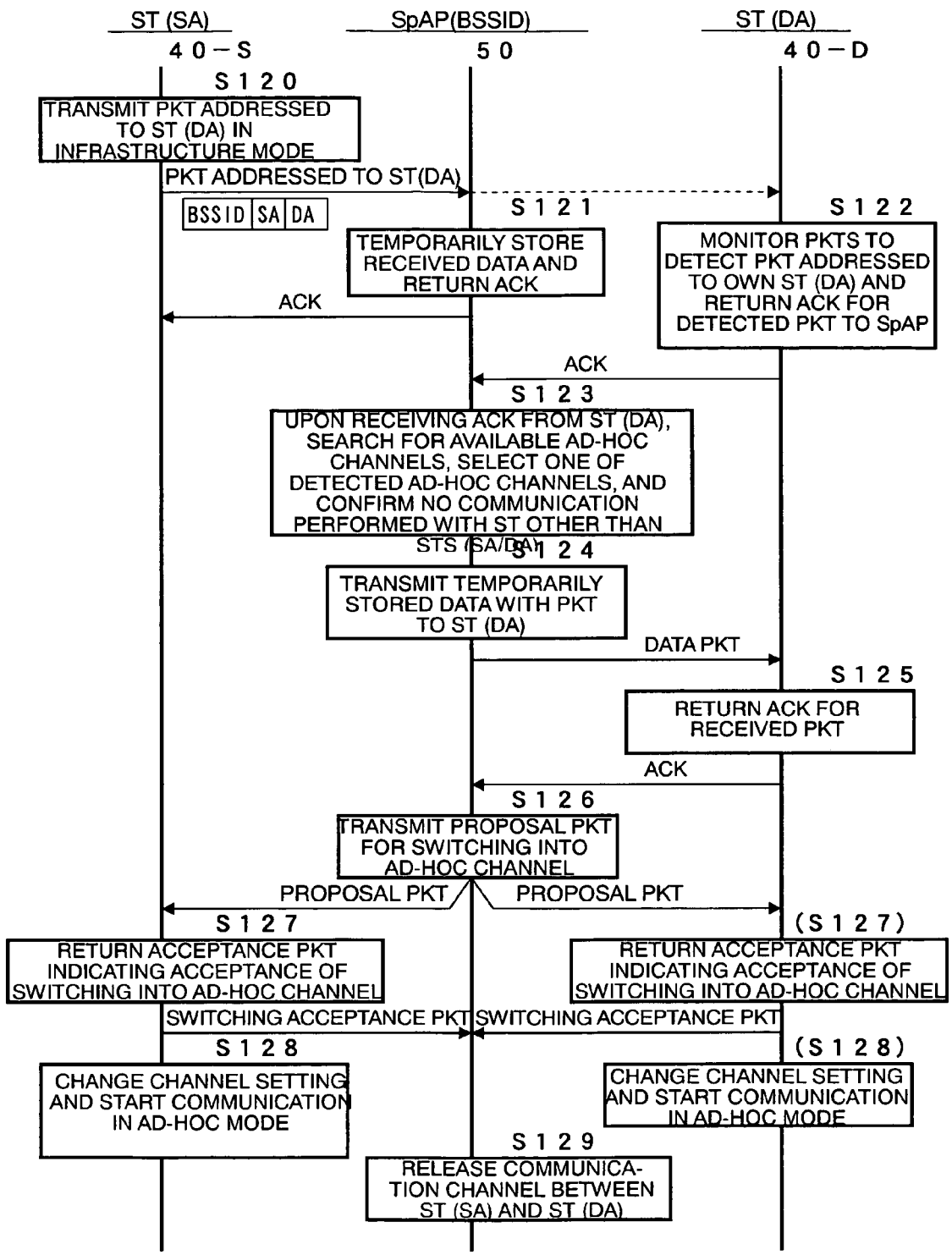
FIG. 6 is a sequence chart showing a mode switching procedure in the wireless LAN communication system shown in FIG. 5, according to an embodiment of the present invention.

Referring to FIG. 6 and also FIG. 5 as required, major portions of a process, performed by the ST(SA) 40-S to switch the communication mode from the infrastructure mode in which communication with the ST(DA) 40-D is performed via the infrastructure network 31 to the ad-hoc mode in which the ST(SA) 40-S and the (DA) 40-D communicate directly with each other using the ad-hoc network 32, are descried below.

First, in the ST(SA) 40-S, the data transmitter/receiver 41 transmits a PKT in the infrastructure mode from the wireless LAN interface 42 to the ST(DA) 40-D via the infrastructure network 31. The PKT includes a header in which "BSSID/SA/DA" is described as address information. If this PKT is successfully received by the SpAP(BSSID) 50 with an address of "BSSID", an acknowledge PKT (hereinafter, referred to simply as an ACK) is returned to the data transmitter/receiver 41 from the SpAP(BSSID) 50. Upon receiving the ACK, the data transmitter/receiver 41 transmits a next PST.

In the SpAP(BSSID) 50, if the data transmitter/receiver 52 receives a PKT from the ST(SA) 40-S, the data transmitter/receiver 52 temporarily stores the data included in the PKT and returns an ACK for the received PKT to the ST(SA) 40 (step S121). The above operation of the data transmitter/receiver 52 is performed under the control of a controller that is not shown in the figures. When an ACK for the PKT transmitted to the ST(DA) 40-S is received, the stored data is deleted.

In general, if the data transmitter/receiver 52 receives PKT data, the data transmitter/receiver 52 inserts address information "DA/BSSID/SA" into the header of the received PKT data and transmits the resultant PKT to the ST(DA) 40-D. If the PKT is received by the ST(DA) 40-D, an ACK is returned from the ST(DA) 40-D to the data transmitter/receiver 52, However, in the present embodiment of the invention, there is a possibility that the data transmitter/receiver 52 receives, from the ST(DA) 40-D, an ACK for the PKT transmitted from the ST(SA) 40-S before the data transmitter/receiver 52 transmits PKT to the ST(DA) 40-D.

This can occur when the ST(DA) 40-D detects a PKT addressed to the ST(DA) 40-D from monitored PKTs transmitted in the infrastructure network 31 and the ST(DA) 40-D transmits an ACK for the detected PKT to the SpAP (BSSID) 50 (step S122).

In the SpAP(BSSID) 50, the ACK is received by the switching controller 54 via the data transmitter/receiver 52. In response to receiving the ACK from the ST(DA) 40-D, the switching controller 54 requests the channel searcher 53 to detect available channels of the ad-hoc network 32. The switching controller 54 selects one of the available channels detected by the channel searcher 53. Furthermore, the switching controller 54 confirms that there is no communication other than the communication with the ST(SA) 40-S and the ST(DA) 40-D (step S123). If the confirmation in step S123 is successful, the switching controller 54 transmits the temporarily stored data in the form of a PKT to the ST(DA) 40-D (step S124).

If the data transmitter/receiver 41 of the ST(DA) 40-D receiver this PKT, the data transmitter/receiver 41 returns an ACK (step S125) to the SpAP(BSSID) 50.

If the switching controller 54 of the SpAP(BSSID) 50 receives the ACK from the ST(DA) 40-D via the wireless LAN interface 51, the switching controller 54 transmits a proposal PKT to both ST(SA) 40-S and ST(DA) 40-D (step S126).

In each of the ST(SA) 40-S and ST(DA) 40-D, if the switching controller 44 receives the proposal PKT, the switching controller 44 returns, to the SpAP(BSSID) 50, an acceptance PKT indicating the acceptance of the proposal of switching into the ad-hoc channel (step S127). Thereafter, the switching controller 44 switches the communication mode into the ad-hoc mode and starts communication in the ad-hoc mode (step S129).

In the SpAP(BSSID) 50, in response to receiving the acceptance PKT, the switching controller 54 releases the infrastructure communication channel between the ST(SA) 40-S and the ST(DA) 40-D (step S129).

Figure 7:
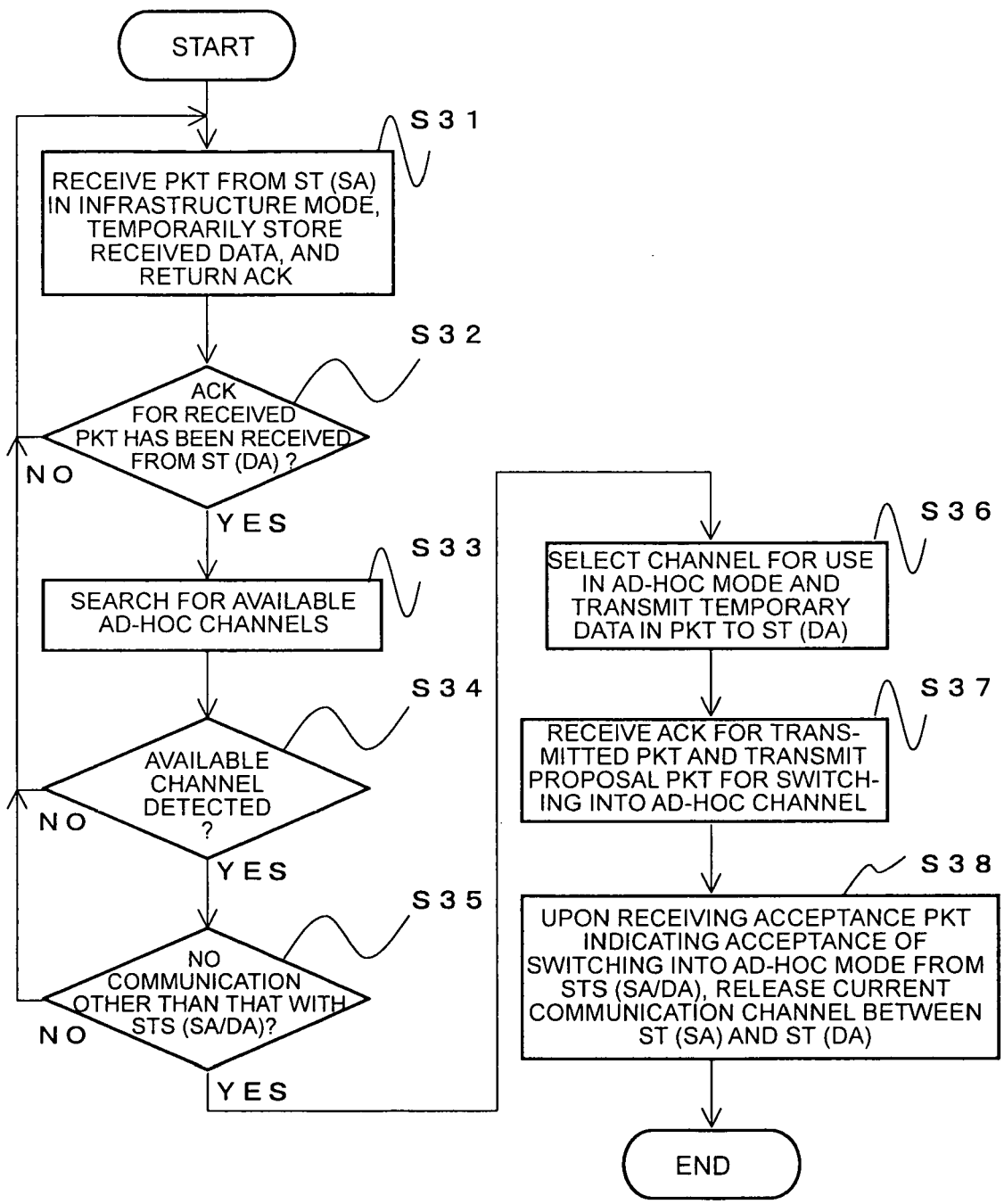
FIG. 7 is a flow chart showing a mode switching procedure performed by a SpAP(BSSID) shown in FIG. 5, according to an embodiment of the present invention.

Referring to FIG. 7 and also FIGS. 5 and 6 as required, the details of the operation of the SpAP(BSSID) 50 are described below.

In the SpAP(BSSID) 50, if the data transmitter/receiver 52 receives a PKT addressed to the ST(DA) 40-D from the ST(SA) 40-S via the infrastructure network 31, the data transmitter/receiver 52 stores the received PKT in the temporary storage unit 55 via the switching controller 54 and returns an ACK (step S31). Note that the data transmitter/receiver 52 performs those steps and following steps under the control of control means that is not shown in the figures.

If the data transmitter/receiver 52 receives an ACK for the PKT data stored in the temporary storage unit 55 from the destination of that PKT data before the data transmitter/receiver 52 transmit the data stored in the temporary storage unit 55 to the destination ST(DA) 40-D, (that is, if the answer to step S32 is yes), the switching controller 54 requests the channel searcher 53 to search for available channels (step S33). If the answer to step S32 is "no", that is, if the ACK is not received, the process returns to step S31. If the ACK is not received in a predetermined period of time, it is determined that an error has occurred, and the communication is terminated, although not shown in the flow chart of FIG. 7.

If an available channel is detected in step S33 (that is, if the answer to step S34 is yes), the switching controller 54 acquires the information associated with the available channels from the channel searcher 53 and confirms that there is no communication other than the communication with the ST(SA) 40-S and the ST(DA) 40-D (step S36). If it is determined in step S34 that no available channel is detected, or if it is determined in step S35 that there is communication other than the communication with the STs(SA, DA) 40-S,-D, the process returns to step S31, and the above-described process is performed repeatedly until an available channel is detected or the communication other than the communication with the STs(SA, DA) 40-S,-D is ended.

If the answer to step S35 is "yes", the switching controller 54 selects one of the available channels for use in the ad-hoc mode, and transmits the temporarily stored data in the form of a PKT to the ST(DA) 40-D (stop S36).

If the switching controller 54 receives an ACK for the above PKT from the ST(DA) 40-D, the switching controller 54 transmits a proposal PKT to the ST 40(SA) 40-S and the ST 40(DA) 40-D to propose that the communication channel should be switched to the selected ad-hoc channel (step S37). If an acceptance PKT is received from the ST(SA) 40-S and the ST(DA) 40-D as a response to the proposal PKT, the switching controller 54 releases the infrastructure communication channel between the ST(SA) 40-S and the ST(DA) 40-D (step S38).

Figure 8:
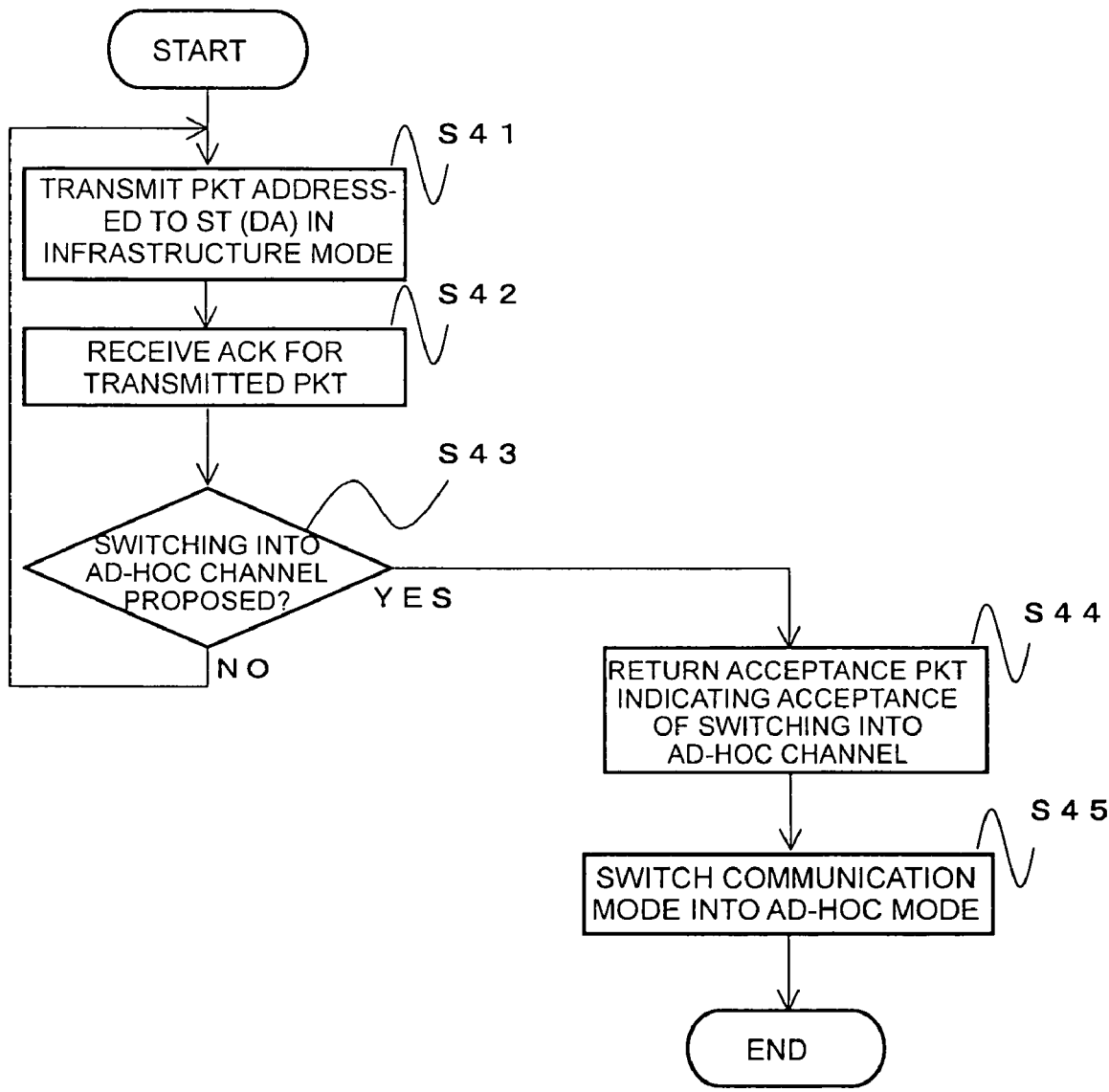
FIG. 8 is a flow chart showing a mode switching procedure performed by an ST(SA) shown in FIG. 5, according to an embodiment of the present invention.

Referring to FIG. 8 and also FIGS. 5 and 6 as required, the details of the operation of the ST(SA) 40-S are described below.

In the ST(SA) 40-S, the date transmitter/receiver 41 transmits, to the SpAP(BSSID) 50 via the wireless LAN interface 42, a PKT addressed to the ST(DA) 40-D, wherein address information "BSSID/SA/DA" is described in the header of the PKT (step S41). If the PKT is received by the SpAP(BSSID) 50, an ACK for the PKT is received (step S42). Although not shown in the flow chart of FIG. 8, if the ACK is not received in a predetermined period of time, the PKT is retransmitted in step S41. When steps S41 and S42 are performed repeatedly, there is a case that the switching controller 44 receives via the data transmitter/receiver 41 a proposal PKT proposing that the communication channel should be switched to an ad-hoc channel, that is, if the answer to step S43 is "yes". In this case, the switching controller 44 returns an acceptance PKT indicating the acceptance of the proposal (step S44) and switches the communication mode into the ad-hoc mode (step S45).

Figure 9:
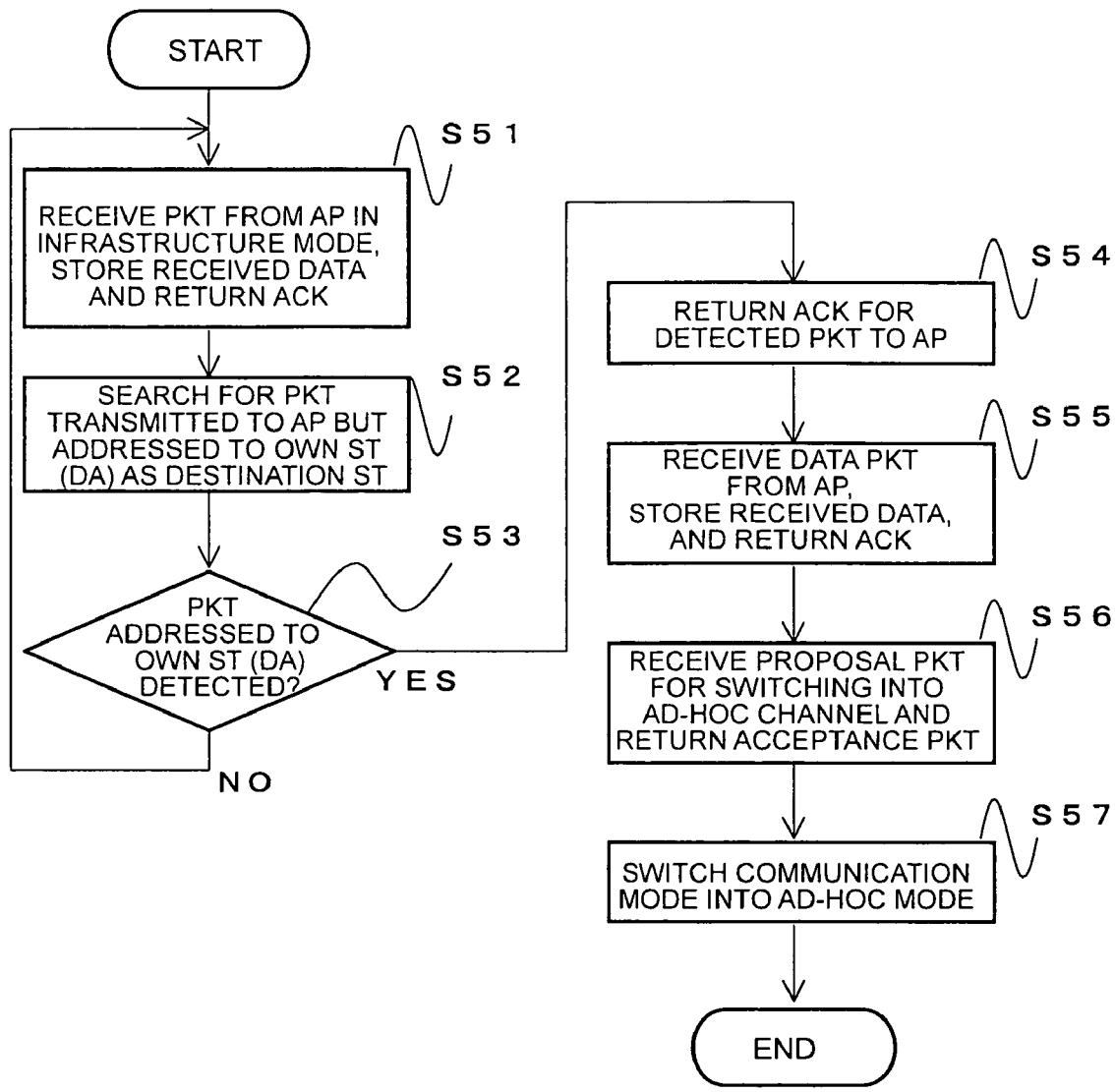
FIG. 9 is a flow chart showing a mode switching procedure performed by an ST(DA) shown in FIG. 5, according to en embodiment of the present invention.

Referring to FIG. 9 and also FIGS. 5 and 6 as required, the details of the operation of the ST(DA) 40-D are described below.

In the ST(DA) 40-D, if the data transmitter/receiver 41 receives a PKT with address information "DA/BSSID/SA" described in its header from the ST(SA) 40-S via the SpAP(BSSID) 50 and the wireless LAN interface 42 in the infrastructure mode, the data transmitter/receiver 41 stores the received PKT data and returns an ACK for the received PKT (step S51). This operation is performed repeatedly each time a PKT is received.

Meanwhile, the header analyzer 43 monitors, via the wireless LAN interface 42, PKTs transmitted in the infrastructure network 31 of the wireless LAN to detect a PKT with address information "BSSID/SA/DA" described in its header transmitted to the SpAP(BSSID) 50 and addressed as a final destination to the ST(DA) 40-D.

If the header analyzer 43 detects a PKT addressed to the final destination ST(DA) 40-D (that is, if the answer to step S53 is yes), the header analyzer 43 notifies the switching controller 44 of the detection of the PKT. The switching controller 44 transmits an ACK for the detected PKT to the SpAP(BSSID) 50 (step S54). Thereafter, if the switching controller 54 receives the PKT from the SpAP(BSSID) 50, the switching controller 54 stores the received PKT data and returns an ACK to the SpAP(BSSID) 50 (step S55). Thereafter, the switching controller 54 receives via the data transmitter/receiver 41 a proposal PKT proposing that the communication channel should be switched to an ad-hoc channel. In this case, the switching controller 44 returns an acceptance PKT indicating the acceptance of the proposal (step S56) and switches the communication mode into the ad-hoc mode (step S57).

Figure 10:
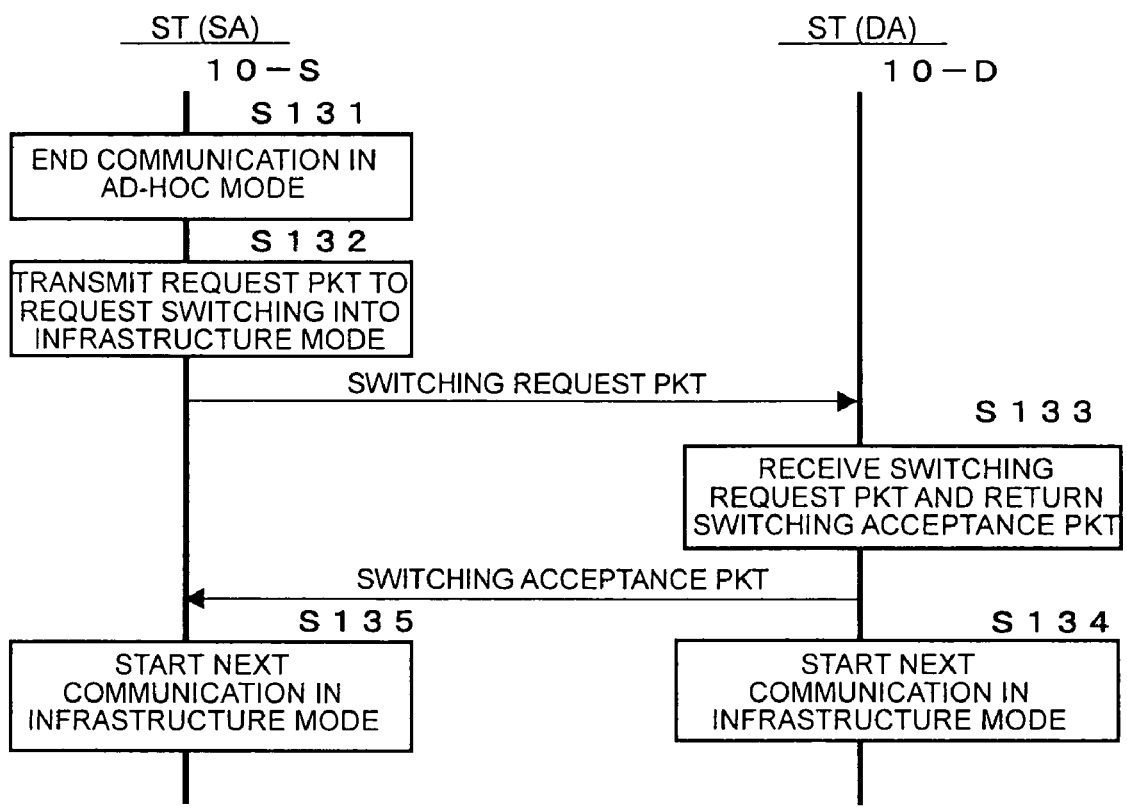
FIG. 10 is a sequence chart showing a mode switching procedure from an ad-hoc mode to an infrastructure mode, according to an embodiment of the present invention.

Referring to FIG. 10 and also FIG. 1 or 5 as required, a process performed by a station after an ad-hoc channel is closed is described below. Although the flow shown in FIG. 10 is described below with reference to FIG. 1, the flow is similar for the wireless LAN system shown in FIG. 5.

If the source station ST(SA) 40-S ends communication in the ad-hoc mode (step S131), the switching controller 14 transmits a request for switching the communication mode to the infrastructure mode to the ST(DA) 40-D (step S132). In the ST(DA) 40-D, in response to receiving the request for switching the communication mode, the switching controller 14 returns an acceptant PKT indicating the acceptance of the request to the ST(SA) 40-S (step S133), switches the communication mode into the infrastructure mode, and continues the communication in the infrastructure mode (step S134). In the ST(SA) 40-S, if the switching controller 14 receives the acceptance PKT indicating the acceptance of request for switching the communication mode, the switching controller 14 switches the communication mode into the infrastructure mode, and continues the communication in the infrastructure mode (step S135).

Figure 11:
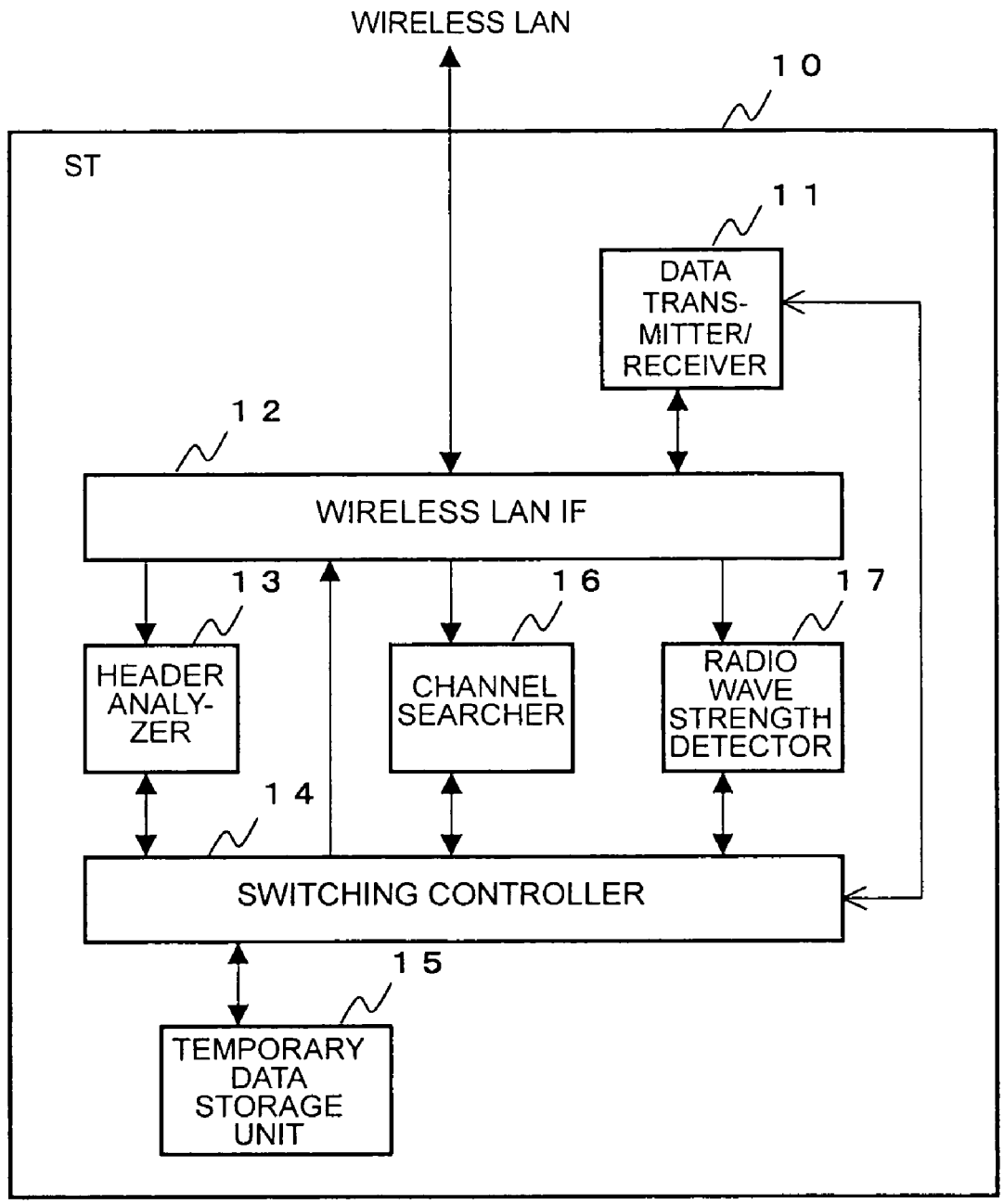
FIG. 11 is a diagram showing an ST having a different functional block configuration from that shown in FIG. 1, according to an embodiment of the present invention.

Referring to FIG. 11 and also FIG. 1 as required, an operation performed when communication in the ad-hoc mode becomes impossible because of degradation in communication condition is described below.

The ST 10 shown in FIG. 11 is similar to that shown in FIG. 1 except that the ST 10 additionally includes a radio wave strength detector 17. The radio wave strength detector 17 monitors the RSSI (received signal strength indication) of the signal received from the wireless LAN via the wireless LAN interface 12. If a reduction in RSSI to a level lower than a predetermined threshold is detected, the radio wave strength detector 17 determines that degradation in communication condition has occurred and the radio wave strength detector 17 informs the switching controller 14 that degradation has occurred.

Figure 12:
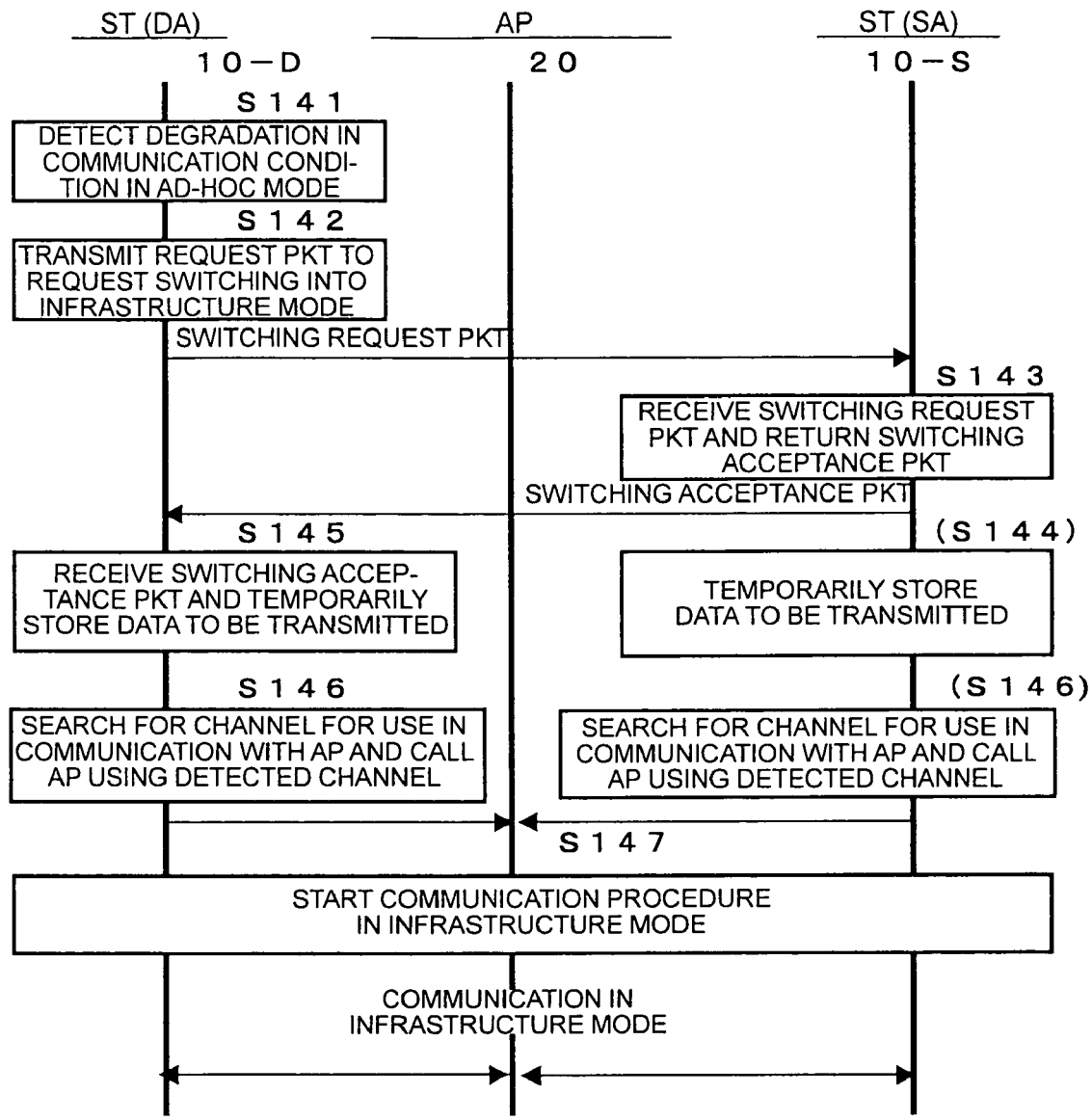
FIG. 12 is a sequence chart showing a mode switching procedure performed by the ST shown in FIG. 11, according to an embodiment of the present invention.

Referring to FIG. 12 and also FIGS. 1 and 11 as required, an operation performed in response to a reduction in RSSI indicating degradation in communication condition is described below.

When the ST(DA) 40-D is receiving data PKTs, if the radio wave strength detector 17 detects a reduction in RSSI to a level lower than the predetermined threshold, the switching controller 14 determines that degradation in communication condition has occurred (step S141), and switching controller 14 transmits a request PKT requesting for switching the communication mode into the infrastructure mode to the source station ST(SA) 40-S (step S142).

Upon receiving the switching request PKT, the switching controller 14 of the ST(SA) 40-S returns an acceptance PKT to the ST(DA) 40-D (step S143), and the switching controller 14 stores data to be transmitted into the temporary data storage unit 15 (step S144).

Upon receiving the acceptance PKT indicating the acceptance of the mode switching, the switching controller 14 of the ST(DA) 40-D stores data to be transmitted in the temporary storage unit 15, if there is such data (step S145).

After completion of steps S144 and S145, the switching controller 14 of each of the STs(SA, DA) 10-S,-D searches for an available channel of the infrastructure network 31 and selects one of available channel. Thereafter, the switching controller 14 calls the general-purpose AP 20 (step S146) and starts a communication procedure in the infrastructure mode (stop S147).

Figure 13:
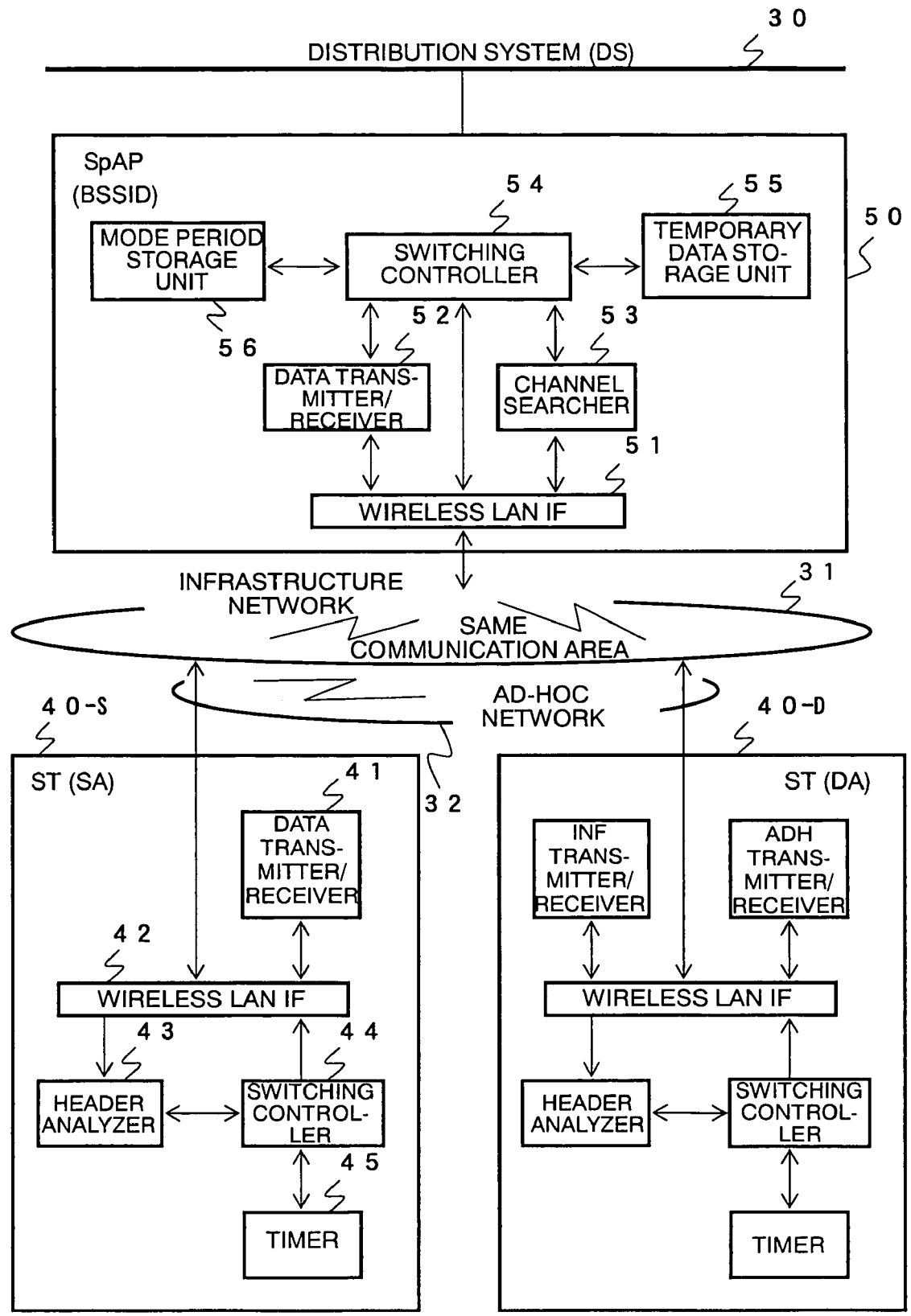
FIG. 13 is a diagram showing functional blocks and connection among functional blocks in a wireless LAN communication system according to still another embodiment of the present invention.
Figure 14:
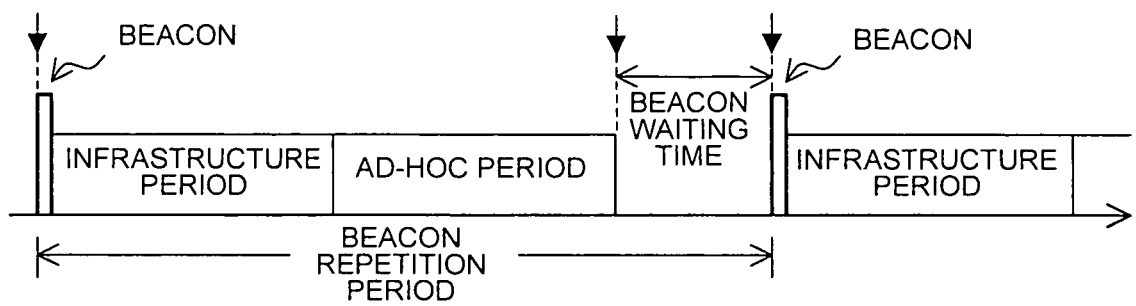
FIG. 14 is a time chart showing various mode periods in the wireless LAN communication system shown in FIG. 13, according to an embodiment of the present invention.

Referring to FIGS. 13 and 14, a wireless LAN communication system, in which even when a station is in the ad-hoc mode, data is transmitted and received while alternately switching the communication mode between the infrastructure made and the ad-hoc mode, is described below.

The wireless LAN communication system shown in FIG. 13 is similar to that shown in FIG. 5 except that each ST(SA, DA) 40-S,-D) additionally includes a timer 45 and the SpAP(BSSID) 50 additionally includes a mode period storage unit 56. In the SpAP(BSSID) 50, under the control of the switching controller, the temporary data storage unit 54 stores information indicating stations communication with which is possible in the ad-hoc mode though the ad-hoc network 32.

In the timer 45, as shown in FIG. 14, the same values as the infrastructure mode period and the ad-hoc mode period determined on the basis of beacon timing and stored in the mode period storage unit 56 of the SpAP 50 are set. Note that those mode periods are determined such that the infrastructure mode period, the ad-hoc mode period, and a beacon waiting period are disposed before each beacon signal transmitted at fixed intervals from the SpAP 50 and the determined periods are stored in the mode period storage unit 56.

Figure 15:
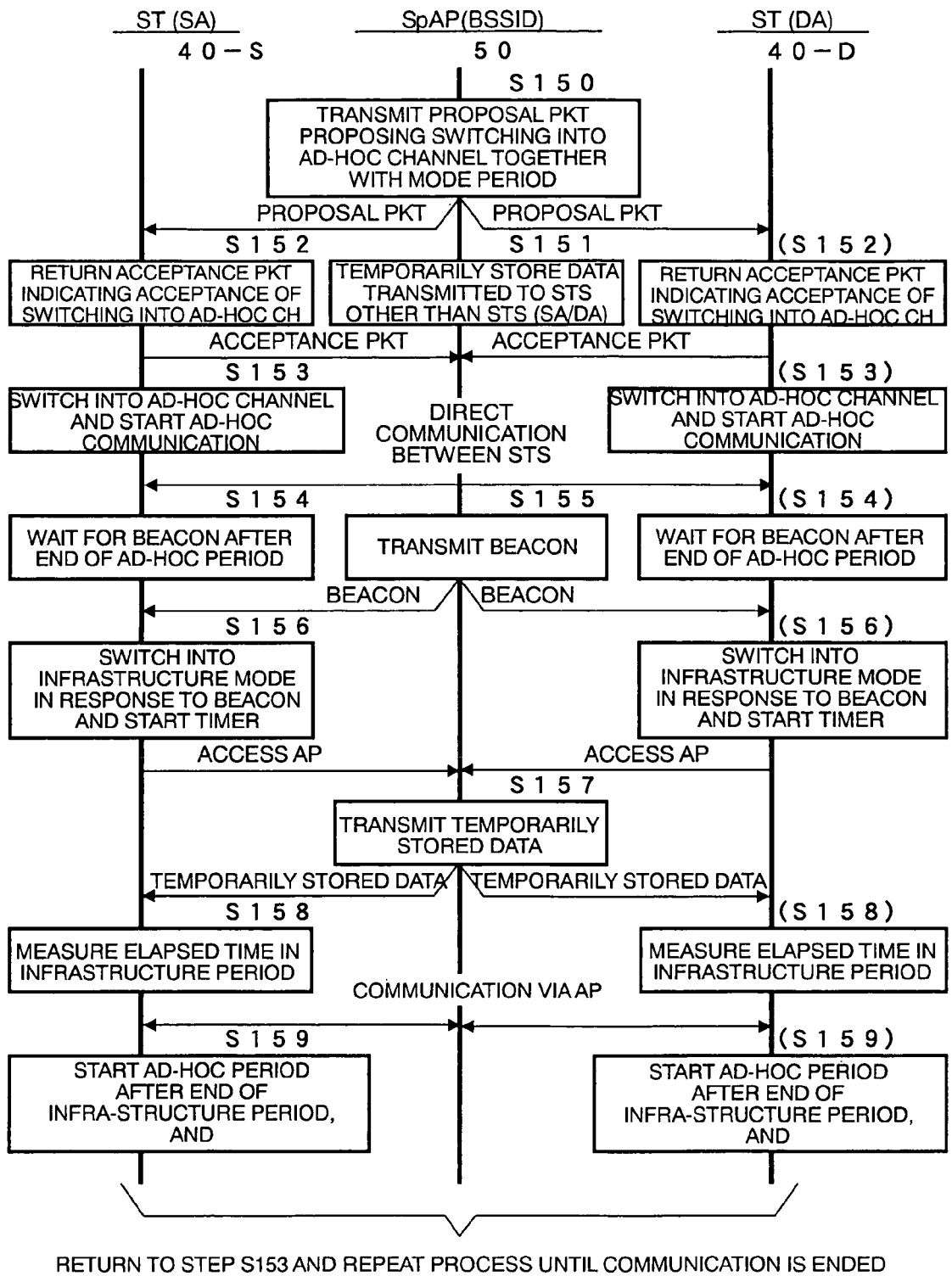
FIG. 15 is a sequence chart showing a mode switching procedure in the wireless LAN communication system shown in FIG. 13, according to an embodiment of the present invention.

Referring to FIG. 15 and also FIGS. 13 and 14 as required, major portions of the operation are described below. The operation is mainly governed by the SpAP(BSSID) 50, and the ST(SA) 40-S and the ST(DA) 40-D operate in a similar manner. Thus, in the following description, the ST(SA) 40-S and the ST(DA) 40-D are generically denoted as ST 40.

In the SpAP 50, as described earlier, the switching controller 54 transmits a switching proposal PKT including information indicating an available channel of the ad-hoc network 31 to the ST(SA) 40-S and the ST(DA) 40-D. The switching controller 54 also reads the infrastructure mode period and the ad-hoc mode period from the mode period storage unit 56 and transmits information indicating the infrastructure mode period and the ad-hoc mode period together with the switching proposal PKT (step S150). The switching controller 54 stores, in the temporary storage unit 55, data to be transmitted to stations other than the ST(SA) 40-S and the ST(DA) 40-D to be connected to the ad-hoc network 32. The temporary storage unit 55 also stores, in the temporary storage unit 55, information associated with communication between the ST(SA) 40-S and ST(DA) 40-D, necessary in switching between the infrastructure mode and the ad-hoc mode. Those data stored in the temporary storage unit 55 are updated as required.

In the ST 40, upon receiving the proposal PKT, the switching controller 44 sets the mode periods in the timer 45 and returns an acceptance PKT indicating the acceptance of the proposal of switching the communication mode to the SpAP 50 (step S152). Thereafter, the switching controller 44 switches the communication mode into the ad-hoc mode and starts communication using the specified channel (step S153). After the end of an ad-hoc mode period, if a beacon waiting period has further elapsed (step S154), the SpAP 50 transmits a beacon signal as in the conventional wireless LAN communication system (step S155). In the ST 40, in response to receiving the beacon signal, the data transmitter/receiver 41 switches the communication mode into the infrastructure mode and accesses the SpAP 50 to make a connection with the infrastructure network 31. At the same time, the timer 45 starts to count the elapsed time in the infrastructure mode period (step S156).

After completion of the connection with the infrastructure network 31, the switching controller 54 of the SpAP 50 transmits the data temporarily stored in step S151 to the destination ST 40 (step S157). Thereafter, communication is continued in the infrastructure mode using the infrastructure network 31 until the infrastructure mode period has elapsed (step S158). If the infrastructure mode period has elapsed, the ad-hoc period starts. Thus, the switching controller 44 of the ST 40 switches the communication channel to a particular ad-hoc channel (step S159), and communication is continued in the ad-hoc mode until the ad-hoc mode has elapsed. Thereafter, the process returns to step S153, and the above-described process is repeated.

Although in the above description, communication starts in the ad-hoc mode and the ad-hoc mode is maintained until the first beacon signal appears, communication may start in the infrastructure mode and the infrastructure mode may be maintained until the first beacon signal appears.

Figure 16:
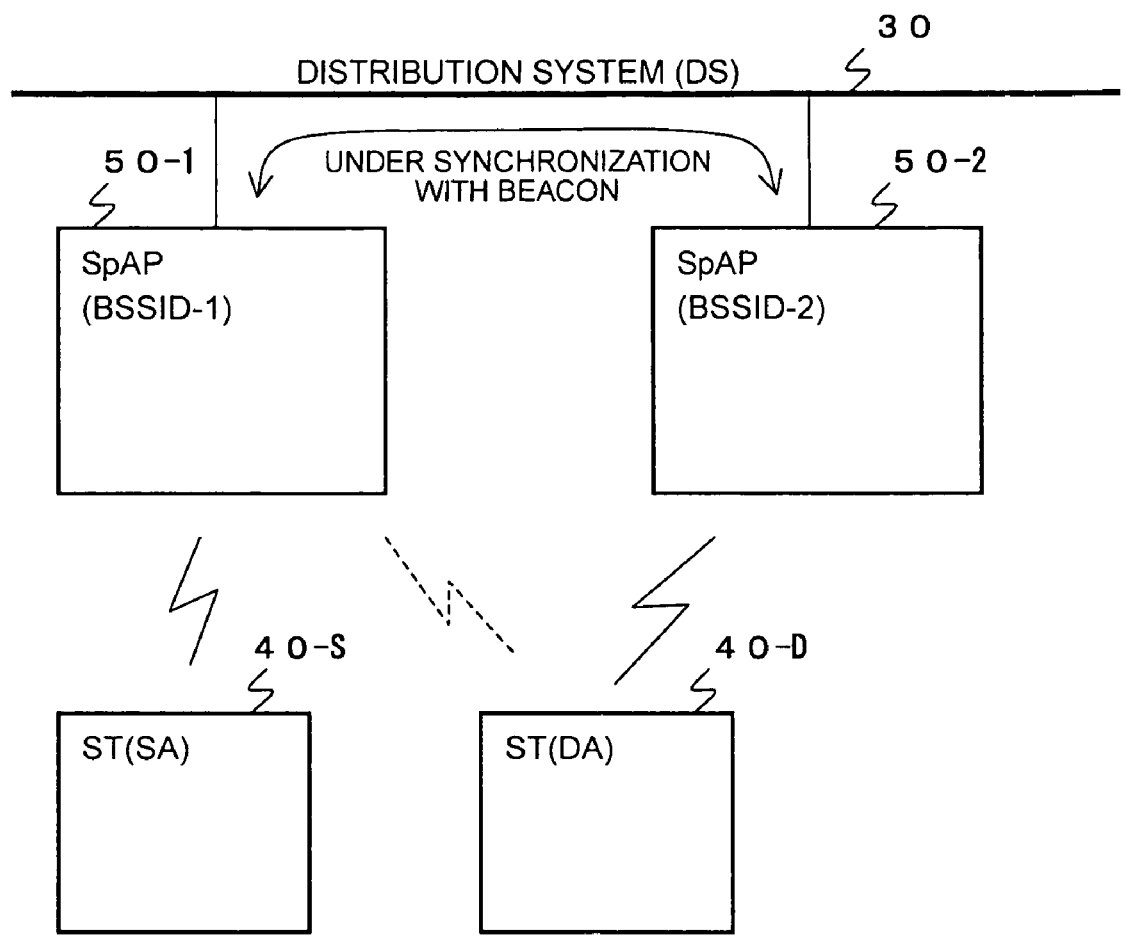
FIG. 16 is a diagram showing functional blocks and connections among functional blocks in a wireless LAN communication system according to an embodiment of the present invention, wherein a roaming process is shown.
Figure 17:
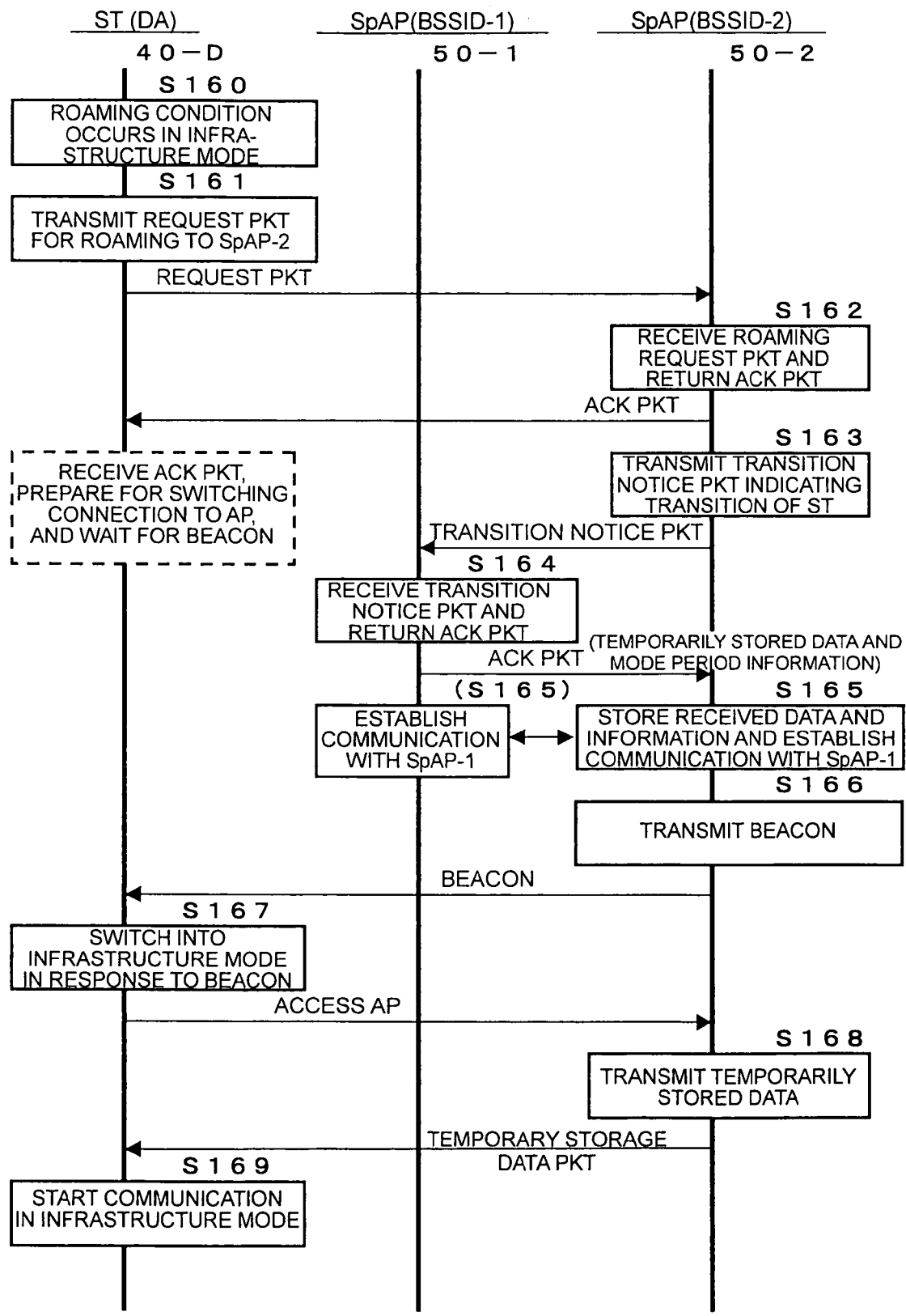
FIG. 17 is a sequence chart showing major portions of the process associated with the wireless LAN communication system shown in FIG. 16.

Referring to FIG. 16 and also FIG. 13 as required, roaming is described below. In FIG. 16, to explain a roaming process, typical two SpAPs 50-1 and 50-2 connected to the DS 30 are shown. The SpAP 50-1 and the SpAP 50-2 operate in synchronization with each other.

For example, if the ST(DA) 40-D detect an occurrence of roaming condition in the infrastructure mode (step S160), the switching controller 44 transmits a roaming request PKT to the SpAP 50-2 to which to switch the connection (step S161).

In the SpAP 50-2, in response to receiving the roaming request PKT, the switching controller 54 returns an ACK PKT for the request to the ST(DA) 40-D (step S182) and transmits a notice PKT, indicating the movement of the station, to the SpAP 50-1 from which the connection is to be switched (step S163). Upon receiving the ACK PKT in step S163, the ST(DA) 40-D prepares for switching the connection to the SpAP 50-2 and waits for a beacon signal to appear.

Upon receiving the movement notice PKT from the SpAP 50-2 in step S163, the SpAP 50-1 returns an ACK PKT to the SpAP 50-2 (step S164). The ACK PKT includes the temporary storage data and the mode period data stored in the SpAP 50-1 so that the ST(DA) 40-D can receive similar service after the roaming. After returning the ACK PKT, the SpAP 50-1 performs setting associated with communication with the SpAP 50-2. The SpAP 50-2 stores the received temporary storage date and the mode period data in a particular storage area, and performs setting associated with communication with the SpAP 50-1 (step S165).

Thereafter, the SpAP 50-2 transmits a beacon signal (step S166). Upon receiving the beacon signal, the ST(DA) 40-D switches the communication mode into the infrastructure mode (step S167) and accesses the SpAP 50-2. Upon receiving the access from the ST(DA) 40-D, the SpAP 50-2 forms a PKT including data stored in the temporary data storage unit 55 and transmits it to the ST(DA) 40-D (step S168), thus the ST(DA) 40-D starts communication with the SpAP 50-2 in the infrastructure mode (step S169).

Even in this state, if the ST(DA) 40-D and the ST(SA) 40-S still connected to the same ad-hoc network 32, the ST 40(SA) may be moved by means of roaming from the SpAP 50-1 to the SpAP 50-2 in a similar procedure.

Figure 18:
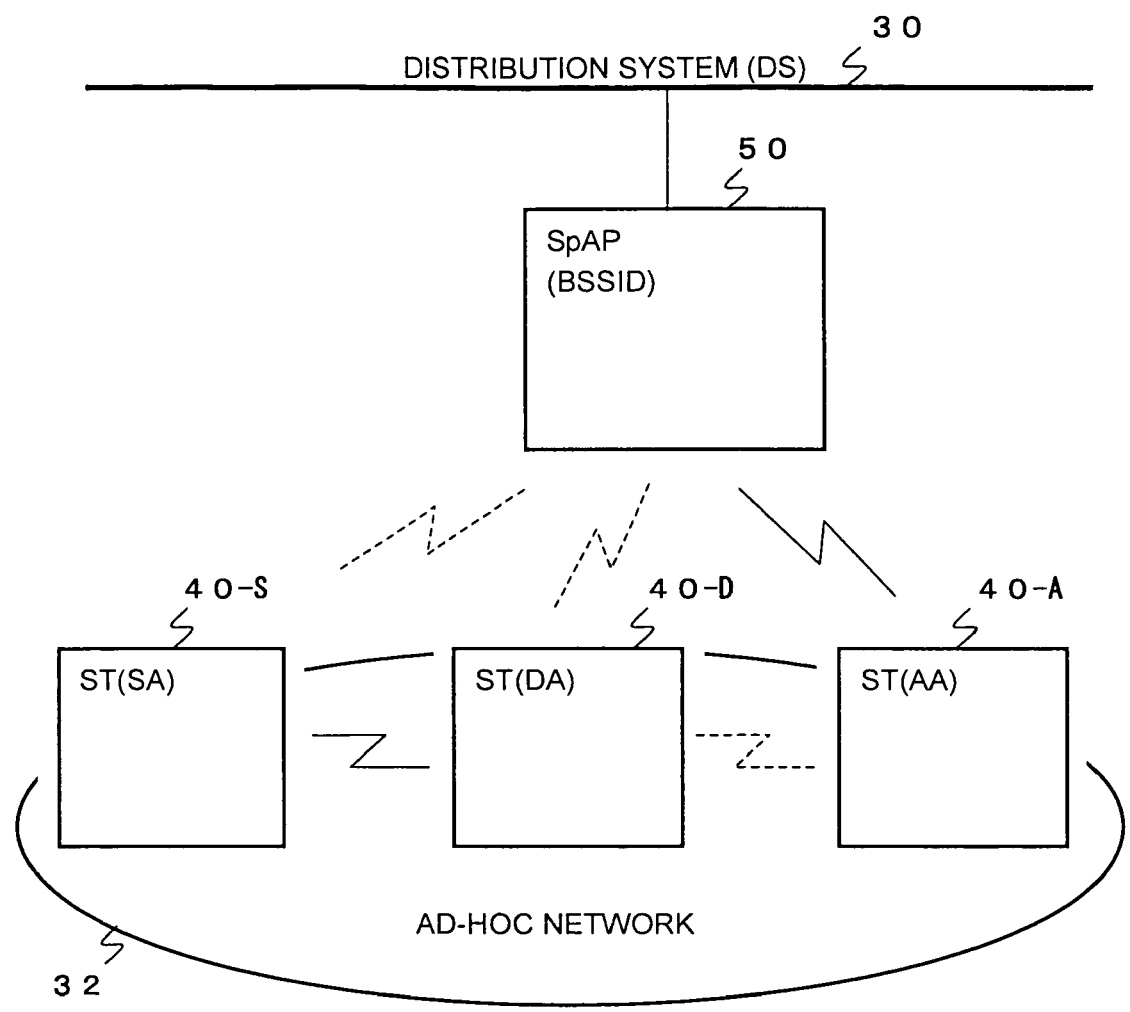
FIG. 18 is a diagram showing functional blocks and connections among functional blocks in a wireless LAN communication system according to an embodiment of the present invention, wherein a process of participating in communication using the same channel of an ad-hoc network is shown.
Figure 19:
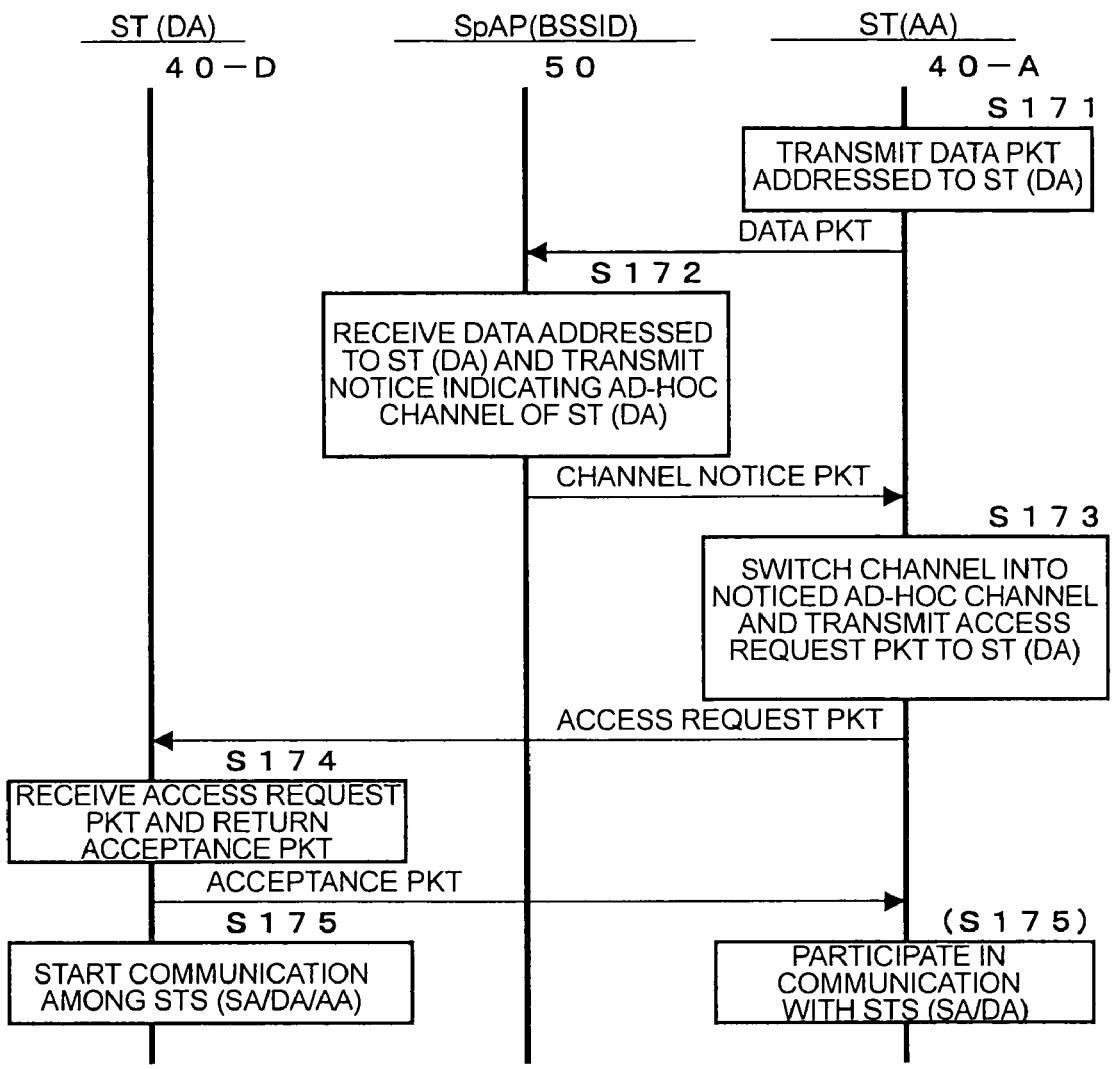
FIG. 19 is a sequence chart showing major portions of the process associated with the wireless LAN communication system shown in FIG. 18.

Referring to FIGS. 18 and 19, a technique of allowing a third station ST(AA) 40-A having a MAC address "AA" to participate in communication being performed between the ST(SA) 40-S and the ST(DA) 40-D via the ad-hoc net 32 is described below.

For example, let it be assumed herein that the ST(AA) 40-A has transmitted data PKT addressed to the final destination ST(DA) 40-D via the SpAP(BSSID) 50 using the infrastructure network 31 (step S171).

In the SpAP(BSSID) 50, communication information associated with the ST(SA) 40-S and the ST(DA) 40-D is stored in the temporary storage unit 55. Therefore, when the switching controller 54 receives data addressed to the ST(DA) 40-D from the ST(AA) 40-A located in the same ad-hoc network 32, the switching controller 54 can read the ad-hoc channel assigned to the ST(DA) 40-D from the temporary storage unit 55 and informs the ST(AA) 40-A of the channel information. That is, the switching controller 54 transmits a channel notice PKT indicating the available ad-hoc channel to the ST(AA) 40-A (step S172).

In the ST(AA) 40-A, the switching controller 44 switches the communication mode into the ad-hoc mode using the specified ad-hoc channel and transmits an access request PKT to the ST(DA) 40-D (step S173) to request the ST(DA) 40-D to allow the ST(AA) 40-A to participate in the communication.

If the ST(DA) 40-D decides to accept the access request, the ST(DA) 40-D returns an acceptance PKT to the ST(AA) 40-A (step S174). Upon receiving the acceptance PKT, the switching controller 44 of the ST(AA) 40-A accesses the same channel of the ad-hoc network 32. As a result, communication among three stations ST(SA/DA/AA) 40-S,-D,-A is established (step S175).

Although the above process includes steps in which the switching controller transmits a PKT to switch the communication mode, it is desirable that the PKT be transmitted by the data transmitter/receiver under the control the switching controller. Although in the embodiments described above, data or signals are transmitted in the form of packets, data or signal may be transmitted in the form of cells or other forms.

Although the embodiments have been descried above with reference to functional blocks and flow charts, the functional blocks may be divided or combined, and the steps in the flows may be changed in order, as long as similar functions are achieved. That is, the present invention is not limited to the details of the embodiments described above, but the invention may be applied to a wide variety of wireless LAN systems.

As described above, the present invention makes it possible to automatically switch the communication mode in which stations such as wireless terminals communicate with each other, between the infrastructure mode and the ad-hoc mode.

More specifically, communication between stations starts in the infrastructure mode. A final destination station monitors packets transmitted in an infrastructure network are monitored to detect a packet transmitted to an access point and addressed as a final destination to the receiving station. If such a packet is detected, the final destination station determines that communication with a transmitting station can be switched into the ad-hoc mode using the same ad-hoc network.

Channels to be used in the ad-hoc mode may be determined by stations. In this case, low cost is imposed on access points. Channels to be used in the ad-hoc mode may also be determined by access points. In this case, low cost is imposed on stations. Temporary storage data may be stored in access points the number of which is smaller than the number of stations. This makes it possible to provide a wide variety of services.

What is claimed is:

1. A wireless LAN communication system having an infrastructure mode in which stations communicate with each other via an access point and also having an ad-hoc mode in which communication is performed directly between stations located near each other, the wireless LAN communication system comprising:

an analyzer monitoring data transmitted from the source station to an access point and addressed, as a final destination, to one's own station in the infrastructure mode, and detecting such data, in the destination station;

a controller being informed the above fact from the analyzer, determining that communication with the source station in the ad-hoc mode is possible, and notifying that communication is possible in the ad-hoc mode to the access point under communication, in the destination station;

a storage unit temporarily storing the data to prevent the data from being lost, in the destination station or the access point notified that communication is possible in the ad-hoc mode;

a searcher selecting and reserving one of available channels for use in communication in the ad-hoc mode, and transmitting a notice indicating the selected channel to the source station of the data, in the destination station or the access point notified that communication is possible in the ad-hoc mode; and each switching controller switching the communication mode into the ad-hoc mode using the selected channel, in the source and destination stations respectively.

2. A wireless LAN communication system having an infrastructure mode in which stations communicate with each other via an access point and also having an ad-hoc mode in which communication is performed directly between stations located near each other, wherein each station comprises:
- an analyzer monitoring data transmitted from the source station to an access point and addressed, as a final destination, to one's own station in the infrastructure mode, and detecting such data, in a case of a station acting as a destination station;
- a storage unit temporarily storing the data to prevent the data from being lost, in a case of a station acting as a destination station;
- a searcher selecting and reserving one of available channels for use in communication in the ad-hoc mode, and transmits a notice indicating the selected channel to the source station of the data, in a case of a station acting as a destination station;
- a controller proposing to the source station via the access point that the communication mode should be switched into the ad-hoc mode using the selected channel, and, if the proposal is accepted, switching the communication channel to the selected channel, in a case of a station acting as a destination station; and
- the controller transmitting data to a destination station in the infrastructure mode, receiving a proposal from the destination station that the communication mode should be switched into the ad-hoc mode using the selected channel, temporarily storing data to be transmitted, returning a response to indicate the acceptance of the proposal, and switching the communication channel to the selected channel, in a case of the station acting as a source station.

3. A wireless LAN communication system according to claim 2, wherein the controller confirms that there is no communication to be performed with a station other than the destination station at the time when the station temporarily stores data to be transmitted as the source station.

4. A wireless LAN communication system according to claim 2, wherein, when communication in the ad-hoc made is to be ended,
- the controller transmits a request for switching the communication mode to the infrastructure mode to the destination station, and closes the communication channel in the ad-hoc mode if the request is accepted, in the case of the station acting as a transmitting station; and
- the controller receives a request for switching the communication mode to the infrastructure mode from a source station, transmits an acceptance response to the source station and closes the communication channel in the ad-hoc mode, in the case of the station acting as a destination station.

5. A wireless LAN communication system according to claim 2, wherein
- the station further comprises a detector for detecting degradation in communication condition to a level lower than a predetermined threshold;
- the controller, in the receiving station, receives a notice indicating degradation in communication condition into a particular degraded state for a signal being received in the ad-hoc mode from the detector, transmits a request for switching the communication mode into the infrastructure mode to the transmitting station; and, when an acceptance response is received from the transmitting station, temporarily stores data to be transmitted;
- the controller, in the transmitting station, receiving the request for switching the communication mode into the infrastructure mode from the receiving station, transmits an acceptance response to the receiving station, temporarily stores data to be transmitted; and
- the controller, in both transmitting and receiving stations, switches the communication mode into the infrastructure mode by selecting a channel and accessing an access point via the selected channel in accordance with a normal procedure of switching to the infrastructure mode.

6. A wireless LAN communication system according to claim 5, wherein the degraded level in terms of the communication condition is a state in which the received signal level is lower than a predetermined threshold.

7. A wireless LAN communication system having an infrastructure mode in which stations communicate with each other via an access point and also having an ad-hoc mode in which communication is performed directly between stations located near each other, wherein
- the access point for transferring data in the infrastructure mode comprises:
- first data transmitter/receiver temporarily storing received data, returning an acknowledge for the received data to a source station, transmitting the data to a destination station, and receiving an acknowledge from the destination station; and
- first controller, when the acknowledge is received before transmitting the temporarily stored data to the destination station, selecting an ad-hoc communication channel and transmitting the temporarily stored data to the destination station, upon receiving an acknowledge in response to the transmitted data, proposing to the source station and the destination station that the channel should be switched into the ad-hoc communication channel, and, if the proposal is accepted, ending the transferring of data; and
- each of the stations comprises:
- second data transmitter/receiver, when data is received from the access point in the infrastructure mode, returning an acknowledge for the received data to the access point; and
- second controller monitoring and searching data transmitted from a source station to an access point and addressed, as a final destination, to one's own station, detecting such data, transmitting an acknowledge for that data to the access point, and, when a proposal for switching the communication channel to an ad-hoc channel is received from the access point, returning an acknowledge for the proposal and switching the communication mode in the ad-hoc mode.

8. A wireless LAN communication system according to claim 7, wherein the first controller confirms that there is no communication to be performed with stations other than the source and destination stations, at a time when the access point selects one of ad-hoc channels.

9. A wireless LAN communication system according to claim 7, wherein, in a case that the access point receives, from a third station, data addressed to one of stations being performing communication in the ad-hoc mode,
- the access points temporarily stores the received data, informs the third station of an ad-hoc channel used by the destination station, and returns the temporarily stored data; and
- the third station, upon receiving the notice of the ad-hoc channel, communicates with the destination station in the ad-hoc mode using the that channel.

10. A wireless LAN communication system according to claim 7, wherein the second controller transmits a request for switching the communication mode into the infrastructure mode to a destination station when transmission of data in the ad-hoc mode is completed, and closes the communication channel in the ad-hoc mode, in the case of the station acting as a source station; and the second controller transmits an acknowledge to the source station when a request for switching the communication mode into the infrastructure mode is received from a source station, and closes the communication channel in the ad-hoc mode, in the case of the station acting as a destination station.

11. A wireless LAN communication system according to claim 7, wherein the access point further comprises a mode period storage unit for an infrastructure mode period and an ad-hoc mode period determined with reference to a timing of transmitting a beacon signal;

the first controller, upon selecting one of ad-hoc channels, transmits period information stored in the mode period storage unit to a relating station, temporarily stores data addressed to the relating station and received from another station, transmits the temporarily stored data to the relating station when the communication mode is switched into the infrastructure mode in response to transmission of a beacon signal, temporarily stores data transmitted from another station and arrived at the relating station being performing communication in the ad-hoc mode into which the communication mode is switched according to the period information, and transmits the beacon signal at predetermined intervals, repeatedly;

the second controller, upon receiving a proposal for switching the communication mode from the access point, returns an acceptance response and switches the communication mode into the ad-hoc mode, after the ad-hoc mode period is ended according to the period information, waits for a beacon signal transmitted from the access point to arrive, switches the communication mode into the infrastructure mode in response to receiving the beacon signal, informs the access point that the communication mode has been switched into the infrastructure mode, receives temporarily stored data from the access point, performs communication in the infrastructure mode and the ad-hoc mode during periods specified by the period information, waits for a next beacon signal to arrive, and performs the above process in synchronization with beacon signals received at predetermined intervals, repeatedly.

12. A wireless LAN communication system according to claim 11, wherein a plurality of access points operate in synchronization with beacons signals in preparation for dealing with roaming and at a time when a mobile station moves from one access point to another access point:

an access point, upon receiving a roaming request from the mobile station and acting as a destination access point to which the mobile station is to move to, responds to the roaming request from the mobile station, transmits a transition notice to the access point with which the mobile station is currently connected, stores, in internal storage unit, temporarily stored data and mode period information received, as a response to the transition notice, from the access point with which the mobile station is currently connected, transmits a beacon signal with predetermined timing, and transmits the temporarily stored data to the mobile station when the mobile station accesses the access point in the infrastructure mode;

the access point, upon acting as an access point with which the mobile station is currently connected and receiving a transition notice from an access point to which the mobile station is to move, and transmits, as a response to the transition notice, temporarily stored data and mode period information to the access point to which the mobile station is to move, the mobile station, in response to detection of occurrence of roaming condition in the infrastructure mode, transmits a roaming request to the access point to which the mobile station is to move, prepares for switching the access point upon receiving a response to the roaming request, switches the communication mode into the infrastructure mode in response to receiving a beacon signal from the access point to which the mobile station is to move, starts accessing the access point to which the mobile station is to move, receives the temporarily stored data from the access point to which the mobile station is to move, and starts communication.

* * * * *